(12) United States Patent
Shikii et al.

(10) Patent No.: US 8,068,196 B2
(45) Date of Patent: Nov. 29, 2011

(54) SURFACE ILLUMINATION DEVICE AND A LIQUID CRYSTAL DISPLAY DEVICE USING SUCH A SURFACE ILLUMINATION DEVICE

(75) Inventors: Shinichi Shikii, Nara (JP); Tatsuo Itoh, Osaka (JP); Kazuhisa Yamamoto, Osaka (JP); Takayuki Nagata, Osaka (JP)

(73) Assignee: Panasonic Corporation, Osaka (JP)

( * ) Notice: Subject to any disclaimer, the term of this patent is extended or adjusted under 35 U.S.C. 154(b) by 884 days.

(21) Appl. No.: 12/110,985

(22) Filed: Apr. 28, 2008

(65) Prior Publication Data

US 2008/0266897 A1 Oct. 30, 2008

(30) Foreign Application Priority Data

Apr. 27, 2007 (JP) ................................. 2007-118671
Apr. 27, 2007 (JP) ................................. 2007-118672

(51) Int. Cl.
*G02F 1/1335* (2006.01)

(52) U.S. Cl. .................................................. 349/65

(58) Field of Classification Search .................. None
See application file for complete search history.

(56) References Cited

U.S. PATENT DOCUMENTS

| 5,515,198 A * | 5/1996 | Kusuda et al. ............. 359/205.1 |
| 7,859,610 B2 * | 12/2010 | Mizushima et al. ............ 349/61 |
| 7,969,532 B2 * | 6/2011 | Mizushima et al. ............ 349/65 |
| 2008/0030691 A1 | 2/2008 | Godo |
| 2009/0066879 A1 * | 3/2009 | Yamamoto et al. ............. 349/62 |
| 2009/0303417 A1 * | 12/2009 | Mizushima et al. ............ 349/65 |
| 2010/0165013 A1 * | 7/2010 | Yamamoto et al. ........... 345/692 |
| 2010/0220261 A1 * | 9/2010 | Mizushima et al. ............ 349/64 |

FOREIGN PATENT DOCUMENTS

| JP | 63-60442 | 3/1988 |
| JP | 4-19612 | 1/1992 |
| JP | 8-111749 | 4/1996 |
| JP | 2003-186427 | 7/2003 |
| JP | 2004-170884 | 6/2004 |
| JP | 2005-159068 | 6/2005 |
| JP | 2005-353816 | 12/2005 |

* cited by examiner

*Primary Examiner* — Timothy L Rude

(74) *Attorney, Agent, or Firm* — Wenderoth, Lind & Ponack, L.L.P.

(57) ABSTRACT

A surface illumination device is provided with a laser light source capable of emitting a laser light, an incident surface on which the laser light is incident, a light guiding plate having a principal surface from which the laser light emerges as a surface emergent light, and an irradiating member capable of irradiating the laser light from the laser light source over a specified range extending in the longitudinal direction of the light guiding plate.

14 Claims, 21 Drawing Sheets

SURFACE ILLUMINATION DEVICE AND A LIQUID CRYSTAL DISPLAY DEVICE USING SUCH A SURFACE ILLUMINATION DEVICE

BACKGROUND OF THE INVENTION

1. Field of the Invention

The present invention relates to a high-luminance surface illumination device using a laser light as a light source and a liquid crystal display device using such a surface illumination device.

2. Description of the Background Art

In a liquid crystal display device used in a display panel or the like, a surface illumination device is used as backlight illumination. A light source such as a discharge tube or a light-emitting diode (LED) is generally used in the surface illumination device. In recent years, in order to realize the higher luminance of the entire surfaces of such display panels, surface illumination devices have been used which employ a multitude of LED light sources of red light (R-light), green light (G-light) and blue light (B-light) from which strong monochromatic lights with high luminance can be obtained. A display device including a surface illumination device employing a multitude of LED light sources has been put into practical use. There is also an ongoing development of display devices including surface illumination devices employing laser light sources as strong monochromatic light sources with high luminance.

For a surface illumination device used in a large-size display device, strong monochromatic lights with high luminance are required and, at the same time, ingenuity to uniformly irradiate lights from light sources is required to eliminate luminance nonuniformity on the entire surface of a display panel. The surface illumination device used in the large-size display device is also required to have a thin shape and a smaller size except a screen.

As an example of such an illumination device, there has been proposed an illumination display device capable of improving the visibility of a displayed shape by making illumination by a light source with strong directivity such as a LED uniform (see, for example, Japanese Unexamined Patent Publication No. 2003-186427). Specifically, this illumination display device is constructed such that light is emitted from the LED arranged at the bottom of a lamp housing to a lightguide arranged above. Parts of the light which cannot be directly emitted to the lightguide are introduced to the lightguide by using the inner side wall of the lamp housing as a reflecting surface. By efficiently introducing the light from the LED to the lightguide in this way, illumination on the lightguide is made uniform.

As an illumination device similarly employing LEDs with strong directivity, the one disclosed, for example, in Japanese Unexamined Patent Publication No. 2005-353816 has been proposed. In this illumination device, lights from the LEDs are efficiently introduced to a lightguide by a tapered rod with a small light intensity loss. The tapered rod is an optical component having a side surface as a full reflecting surface for fully reflecting the incident illumination light and an emergent end surface having a larger area than an incident end surface and adapted to emit the illumination light fully reflected by the side surface. In other words, this illumination device is designed to make the illumination light on the lightguide uniform by introducing substantially the total amount of the lights from the LEDs by way of the tapered rod.

There has been also proposed an illumination optical device constructed such that a uniform intensity distribution can be obtained to perform a uniform exposure by disposing a fly's eye lens having a magnification corresponding to the light intensity distribution of an excimer laser before a diffuser (see, for example, Japanese Unexamined Patent Publication No. 63-60442).

On the other hand, a proposal has also been made for light irradiation apparatuses and image forming apparatuses of the type for scanning a laser light to realize a light source suitable for the respective apparatuses by changing the intensity distribution of the laser light.

In linear light irradiation apparatuses in the fields of measuring and cutting work, an optical member called "cylindrical lens" has been proposed as disclosed, for example, in Japanese Unexamined Patent Publication No. 2004-170884. In the cylindrical lens, at least one of an incident surface and an emergent surface is a cylindrical surface. By emitting laser lights from a plurality of laser light sources to this cylindrical lens, the light intensities of the respective laser light sources are added, whereby a linear light with an increased light intensity can be obtained.

For example, as in an image forming apparatus disclosed in Japanese Unexamined Patent Publication No. H08-111749, it has been proposed that a laser light is transmitted to a photoconductive member substantially without changing its beam diameter and an intensity change of the laser light is electrically compensated to scan a laser light with constant intensity and beam diameter on the photoconductive member by devising an optical construction.

Here, the visibility of images is improved by making the luminance of the display panel surface uniform with high luminance in the entire panel. On the other hand, image characteristics upon viewing images can be improved if only the luminance of the display panel central part where viewer's attentions are generally concentrated is increased instead of making the luminance of the entire display panel uniform. Further, power consumption can be reduced since it is not necessary to increase the luminance of the entire display panel. In other words, image characteristics can be efficiently improved by locally increasing the luminance in the part of the display panel where attentions are concentrated. Specifically, for a display such as an advertising screen installed at such a high position that viewers look up, visibility is thought to be improved by locally increasing the luminance in an upper part of the screen more distant from the viewers as compared to the case where the luminance of the entire screen is made uniform.

However, in the above respective prior art technologies, no consideration was made concerning a construction for introducing a laser light such that the luminance of a luminous surface comes to have a desired distribution. Neither disclose the above respective prior art technologies a construction for realizing both an adjustment of the luminance of the luminous surface to a desired distribution and a reduction in laser light loss.

SUMMARY OF THE INVENTION

In view of the above prior art problems, an object of the present invention is to provide a surface illumination device capable of adjustment to a desired luminance distribution and a liquid crystal display device using such a surface illumination device.

One aspect of the present invention is directed to a surface illumination device, comprising a laser light source for emitting a laser light; a light guiding plate having an incident surface on which the laser light is incident and a principal surface from which the laser light emerges as a surface emergent light; an irradiating member capable of irradiating the laser light from the laser light source within an irradiation range including an incident range for introducing the laser light to the incident surface of the light guiding plate and an outside range set outside the incident range in the longitudinal direction of the incident surface; and a guiding member capable of introducing a part of the laser light from the irradiating member within the outside range to the incident surface, the laser light from the irradiating member and the laser light from the guiding member being respectively introduced to at least a part of the incident surface.

Another aspect of the present invention is directed to a surface illumination device, comprising a laser light source for emitting a laser light; a light guiding plate having an incident surface on which the laser light is incident and a principal surface from which the laser light emerges as a surface emergent light; and an irradiating member capable of irradiating the laser light from the laser light source to the incident surface of the light guiding plate over a specified range extending in the longitudinal direction of the incident surface of the light guiding plate, wherein the irradiating member is constructed such that a light intensity distribution of the laser light incident on the incident surface becomes a specified light intensity distribution in the longitudinal direction of the incident surface.

Still another object of the present invention is directed to a liquid crystal display device, comprising a liquid crystal display panel and a backlight illumination device for illuminating the liquid crystal display panel from the back side of the panel, wherein the backlight illumination device is the surface illumination device.

According to the present invention, the luminance of the light guiding plate can be adjusted to a desired luminance distribution.

DETAILED DESCRIPTION OF THE PREFERRED EMBODIMENTS OF THE INVENTION

Figure 1:
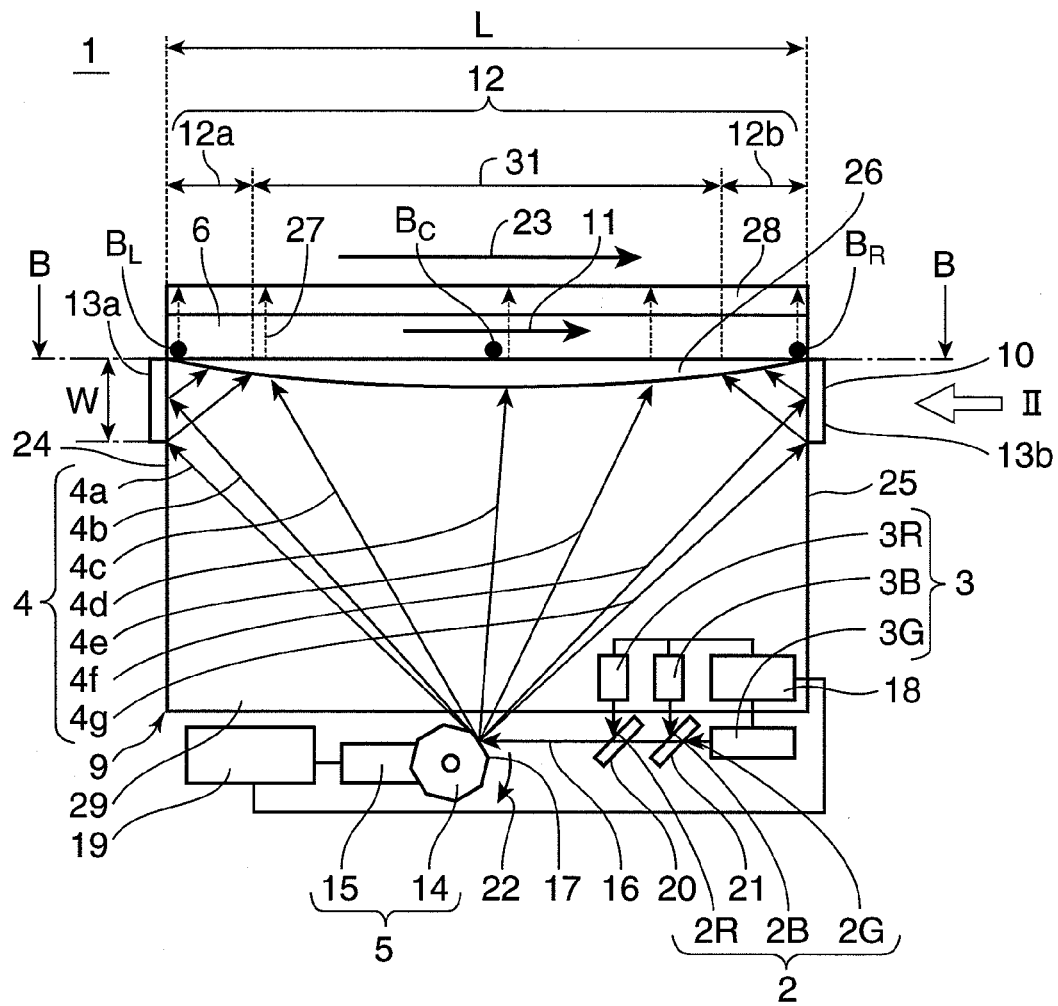
FIG. 1 is a schematic construction diagram of a surface illumination device according to a first embodiment of the invention when viewed from behind.

Hereinafter, embodiments of the present invention are described with reference to the accompanying drawings. It should be noted that the same elements may not be repeatedly described by being identified by the same reference numerals. For easier understanding, constituent elements are primarily schematically shown and the shapes thereof are not precisely shown.

First Embodiment

Figure 2:
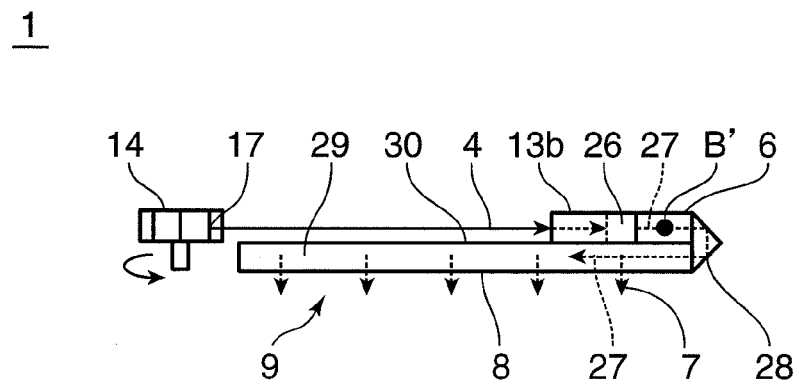
FIG. 2 is a diagram showing the construction of a side surface of a main part of the surface illumination device when viewed in a direction II of FIG. 1.

FIG. 1 is a schematic construction diagram of a surface illumination device according to a first embodiment of the invention when viewed from behind, and FIG. 2 is a diagram showing the construction of a side surface of a main part of the surface illumination device when viewed in a direction II of FIG. 1.

As shown in FIGS. 1 and 2, a surface illumination device 1 of this embodiment is provided with laser light sources 3 for emitting laser lights 2, a scanning unit (irradiating member) 5 for generating linear scanning lights 4 by reflecting the laser lights 2, a light guiding plate 9 on which the scanning lights 4 are incident, a guiding member 10 capable of introducing the scanning lights 4 to the light guiding plate 9 and a controller 19 for controlling the driving of the laser light source 3 and the scanning unit 5.

The light guiding plate 9 includes a cylindrical lens 26 having an incident surface on which the scanning lights 4 are incident, a light guiding portion 6 for introducing scanning lights 27 from the cylindrical lens 26, a connecting portion 28 for returning the scanning lights 27 introduced by the light guiding portion 6, and a light guiding portion main body 29 having a principal surface 8 from which the scanning lights 27 from the connecting portion 28 are emitted as a surface emergent light 7.

The guiding member 10 is arranged between the light guiding portion 6 and the scanning unit 5 and constructed such that the intensities of the scanning lights 4 incident on the light guiding portion 6 exhibit a specified light intensity distribution (substantially uniform light intensity distribution in this embodiment) in the longitudinal direction 11 of the light guiding portion 6 (longitudinal direction of the incident surface of the cylindrical lens 26).

Specifically, the guiding member 10 includes reflection mirrors 13 (13a, 13b) extending from ends 12 of the light guiding portion 6 in the longitudinal direction 11 toward the scanning unit 5 (in a direction perpendicular to the longitudinal direction 11), for example, as shown in FIGS. 1 and 2. In other words, the reflecting mirror 13a is arranged at a left end 12a of the light guiding portion 6 and the reflecting mirror 13b at a right end 12b of the light guiding portion 6 in this embodiment. These reflecting mirrors 13a, 13b are so formed as to reflect the scanning lights 4 (4a, 4b, 4f, 4g, etc.), which would propagate toward positions outside this incident surface of the cylindrical lens 26 in the absence of the reflection mirror 13a, 13b to the incident surface of the cylindrical lens 26. In this embodiment, by reflecting the scanning lights 4 (4a, 4b, 4f, 4g) incident on the reflecting mirrors 13 (13a, 13b) out of the scanning lights 4, the intensity of the scanning lights incident on the light guiding portion 6 is made substantially uniform.

The scanning unit 5 includes a polygonal mirror 14 and a driving portion 15 for driving the polygonal mirror 14.

The laser light sources 3 include at least a red laser light source (R-light source) 3R for emitting a red laser light (R-light) 2R, a green laser light source (G-light source) 3G for emitting a green laser light (G-light) 2G and a blue laser light source (B-light source) 3B for emitting a blue laser light (B-light) 2B. These R-light 2R, green light 2G and blue light 2B are introduced to the scanning unit 5 along the same optical path 16 and are reflected by mirror surfaces 17 of the polygonal mirror 14 to be introduced to the light guiding plate 9 or the guiding member 10 as the scanning lights 4.

The controller 19 controls a power supply 18 of a laser light source 12 and the driving portion 15 of the scanning unit 5.

Next, the operation of the surface illumination device 1 constructed as above is described with reference to FIGS. 1 and 2. The R-light 2R, G-light 2G and B-light 2B are combined into one laser light 2 as a RGB light by dichroic mirrors 20, 21 and introduced to the scanning unit 5 along the same optical path 16. This laser light 2 is reflected by the mirror surfaces 17 of the polygonal mirror 14 of the scanning unit 5 to become the scanning lights 4 to be irradiated over a linear range extending in the longitudinal direction 11 of the light guiding portion 6. In this embodiment, the mirror surfaces 17 are flat surfaces constituting the outer side surfaces of the polygonal mirror 14 having an equilateral octagonal shape.

If the polygonal mirror 14 rotates in a direction of an arrow 22, the scanning lights 4 from the polygonal mirror 14 are successively scanned from left to right in an order of 4a, 4b, 4c, 4d, 4e, 4f and 4g along a scanning direction 23 parallel to the longitudinal direction 11 of the light guiding portion 6 shown in FIG. 1.

Out of the scanning lights 4, the leftmost scanning light 4a is incident on the light guiding portion 6 by being reflected by the reflecting mirror 13a arranged at a left end 24 of the light guiding plate 9. The scanning light 4b is incident on the light guiding portion 6 by being reflected by the reflecting mirror 13a similar to the scanning light 4a.

On the other hand, the scanning lights 4c, 4d and 4e are directly incident on the light guiding portion 6 from the mirror surfaces 17 without being reflected by the reflection mirrors 13a, 13b. These scanning lights 4c, 4d and 4e are incident on the light guiding portion 6 after having the propagation directions thereof bent by the cylindrical lens 26 arranged before the light guiding portion 6 to become scanning lights 27 parallel to the left end 24 and right end 25 of the light guiding plate 9.

Out of the scanning lights 4, the second rightmost scanning light 4f and the rightmost scanning light 4g are reflected by the reflection mirror 13b arranged at the right end 25 of the light guiding plate 9 to be incident on the light guiding portion 6.

The scanning lights 27 incident on the light guiding portion 6 from the cylindrical lens 26 are turned by 180° by the connecting portion 28 in the form of a bar-shaped prism to be introduced to the light guiding plate main body 29 after propagating in a direction perpendicular to the scanning direction 23. The scanning lights 27 are scattered inside the light guiding plate main body 29 and emerge from the principal surface 8 as the emergent light 7. In light of causing the emergent light 7 to actively emerge from the principal surface 8 of the light guiding plate main body 29, coating for reflecting the scanning lights 27 may be applied to a back surface 30 of the light guiding plate main body 29.

The light guiding portion 6, on which the scanning lights 4 are incident, is arranged atop the light guiding plate main body 29 as shown in FIGS. 1 and 2. Although the cylindrical lens 26 is used to cause the scanning lights 4 to be incident on the light guiding portion 6 in the direction perpendicular to the scanning direction 23 in FIGS. 1 and 2, any one of a toric lens, a Fresnel lens and a diffractive optical element may be used in place of the cylindrical lens 26. Further, the cylindrical lens 26 may be omitted depending on the angles and beam diameters of the scanning lights 4 incident on the light guiding portion 6 and a diffused state in the light guiding plate main body 29. If the cylindrical lens 26 is omitted, an end surface of the light guiding portion 6 serves as an incident surface, on which the scanning lights 4 are incident.

The scanning lights 4a, 4b, 4f and 4g reflected by the reflection mirrors 13 (13a, 13b) are those that would be lost without being incident on the light guiding portion 6 in the absence of the reflection mirrors 13. In this embodiment, most of the light intensities of the scanning lights 4 that would be lost are incident on the left end 12a and right end 12b of the light guiding portion 6 (i.e. parts proximate to the left end 24 and right end 25 of the light guiding plate 9) by arranging the reflection mirrors 13.

Figure 3:
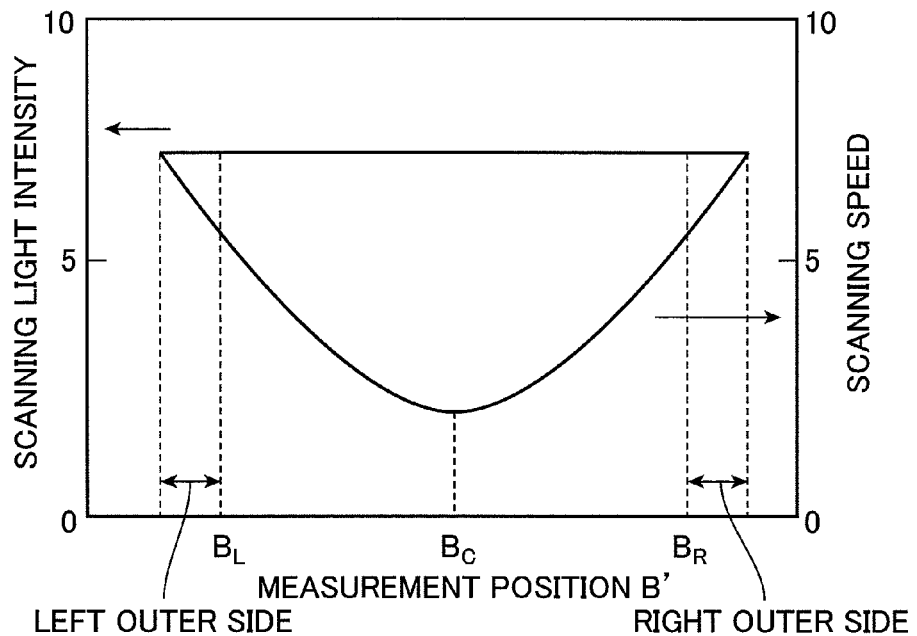
FIG. 3 is a graph showing a relationship between the scanning light intensities and the scanning speeds of scanning lights at measurement positions B' ($B_L$, $B_C$, $B_R$) of a light guiding portion in a section along B-B of FIG. 1.
Figure 4:
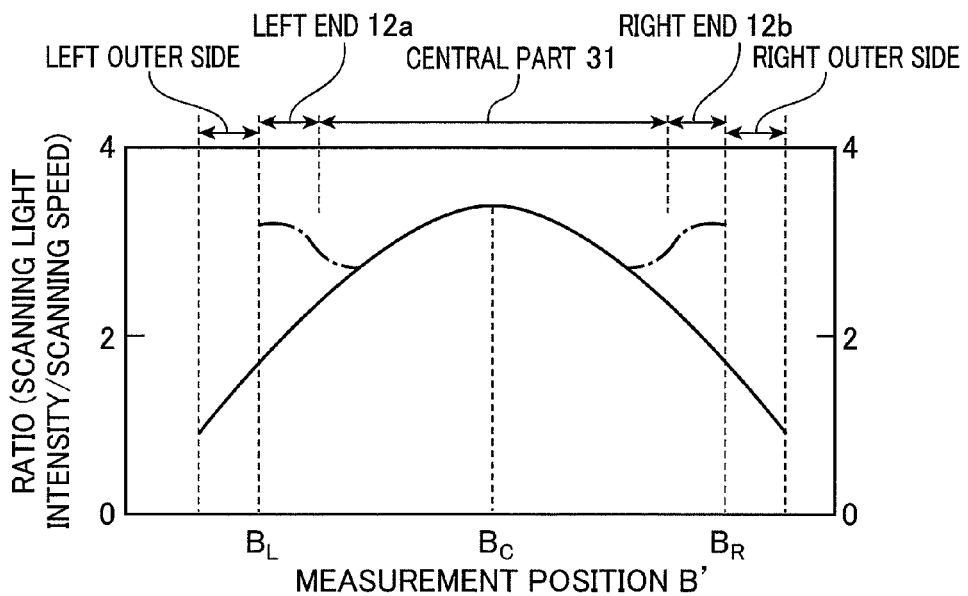
FIG. 4 is a graph showing ratios of the scanning light intensity and the scanning speed at the measurement positions B' of FIG. 1.

FIG. 3 is a graph showing a relationship between the scanning light intensities and the scanning speeds of the scanning lights 4 at measurement positions B' ($B_L$, $B_C$, $B_R$) of the light guiding portion 6 in a section along B-B of FIG. 1, and FIG. 4 is a graph showing ratios of the scanning light intensity and the scanning speed at the measurement positions B' of FIG. 1. It should be noted that the scanning light intensities and the scanning speeds are expressed by arbitrary units.

In the case of rotating the polygonal mirror 14 at a constant speed, a scanning speed determined by this polygonal mirror 14 and the mirror surfaces 17 is represented by a curve as shown in FIG. 3 with respect to the measurement positions B'. In other words, the representing curve is such that the scanning speed is maximized at the measurement position $B_L$ near the left end 24 of the light guiding plate 9 and at the measurement position $B_R$ near the right end 25 while being minimized at a central part $B_C$ of the light guiding plate 9. On the other hand, in the case of making the light intensities of the laser lights 2 constant, the light intensities of the scanning lights 4 are also constant. Thus, the scanning light intensities at the measurement positions B' are presented by a straight line as shown in FIG. 3. Therefore, a ratio of the scanning light intensity to the scanning speed per unit length of the light guiding portion 6 in the scanning direction 23 is large in a central part 31 of the light guiding plate 9 and small at the opposite ends 12 (12a, 12b) of the light guiding plate 9 as shown by a solid-line curve in FIG. 4.

Here, in the absence of the reflection mirrors 13 (13a, 13b) arranged at the left end 24 and right end 25 of the light guiding plate 9, the scanning lights 4a, 4b, 4f and 4g propagate toward the left and right outer sides of the light guiding plate 9. Thus, the light intensities of the laser lights that would be lost at the left and right outer sides of the light guiding plate 9 are represented by sections defined between broken lines in FIGS. 3 and 4. On the other hand, if the reflection mirrors 13 (13a, 13b) are arranged as in this embodiment, the scanning lights 4a, 4b, 4f and 4g are reflected by the reflection mirrors 13 (13a, 13b) to be introduced to the light guiding portion 6. Accordingly, the ratio of the scanning light intensity to the scanning speed of the scanning lights 4 in this embodiment increases at the left end 12a and right end 12b as shown by dashed-dotted line in FIG. 4, thereby being made substantially uniform in the longitudinal direction 11 of the light guiding portion 6. The unevenness of the light intensity distribution shown in FIG. 4 becomes smaller as the scanning lights 27 propagate through the light guiding plate 9, whereby the light intensity distribution on the principal surface 8 of the light guiding plate main body 29 is made uniform to a certain degree.

Generally, if a distance between the scanning unit 5 and the light guiding portion 6 is shortened to make a scanning optical system smaller, the scan angle of the scanning unit 5 needs to be widened by reducing the number of the reflecting surfaces of the polygonal mirror 14. However, if the number of the reflecting surfaces of the polygonal mirror 14 is reduced, the scan angle is widened, but a difference in the scanning speed between the central part (near $B_C$) and the right, left ends (near $B_R$ and $B_L$) increases, with the result that luminance at the left and right sides of the screen decreases. On the contrary, the luminance of the scanning lights 4 incident on the light guiding portion 6 can be made relatively uniform in the longitudinal direction of the light guiding portion 6 by slightly extending the distance from the scanning unit 5 to the light guiding portion 6 and setting a larger scanning range of the scanning unit 5 than a longitudinal dimension L of the light guiding portion 6. However, in this case, the laser lights deviated from the longitudinal dimension L of the light guiding portion 6 are lost and, therefore, the utilization efficiency of the laser lights is reduced. Accordingly, by adopting the guiding member 10 of this embodiment, the laser lights that would propagate to the outside of the light guiding portion 6 can be efficiently introduced to the light guiding portion 6 by the guiding member 10. Thus, according to the surface illumination device 1 of this embodiment, the laser lights can be effectively utilized while the loss of the laser lights is suppressed, wherefore luminance at specified positions can be increased while power consumption is suppressed. Further, luminance normally decreases at the scanning ends in the longitudinal direction 11, but the light intensities of the scanning lights 4 incident on the light guiding portion 6 can be made substantially uniform in this embodiment by adding the light intensities of the laser lights that would have been lost before.

Generally, in order to cause the laser lights to scan the incident surface with uniform light intensity, a lens having a plurality of curved surfaces such as an fθ lens needs to be used. However, the construction including the reflection mirrors 13a, 13b as in this embodiment can be very inexpensive.

Since the optical paths of the laser lights 2 introduced from the laser light sources 3 to the light guiding portion 6 via the scanning unit 5 are set at the back surface 30 side of the light guiding plate 9 in this embodiment, the thin and lightweight surface illumination device 1 can be realized.

Further, since the scanning lights 4c, 4d and 4e from the scanning unit 5 as the scanning lights 4 and the scanning lights 4a, 4b, 4f and 4g from the guiding member 10 having different optical paths are incident on the light guiding portion 6 in this embodiment, the emergent light outputted from the principal surface 8 of the surface illumination device 1 has a suppressed level of speckle noise.

Figure 5:
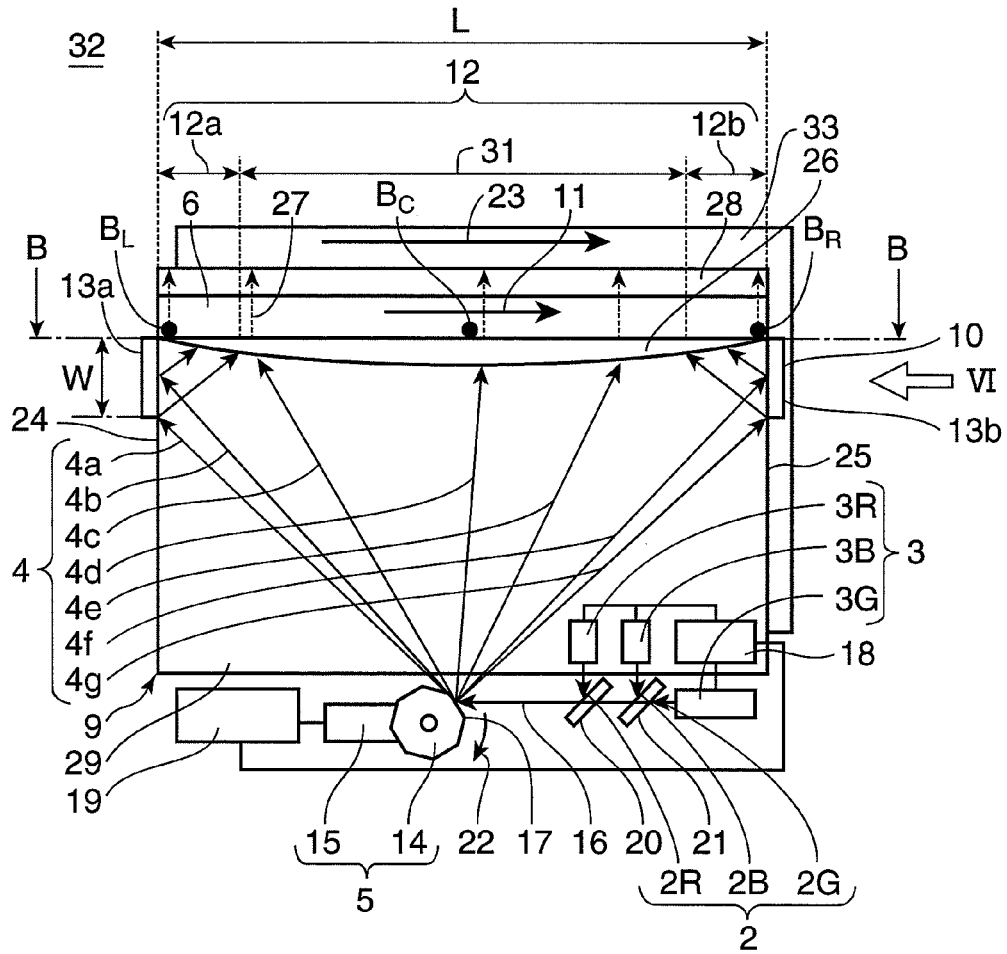
FIG. 5 is a schematic construction diagram of a liquid crystal display device using the surface illumination device of FIG. 1 as a backlight illumination device when viewed from behind.
Figure 6:
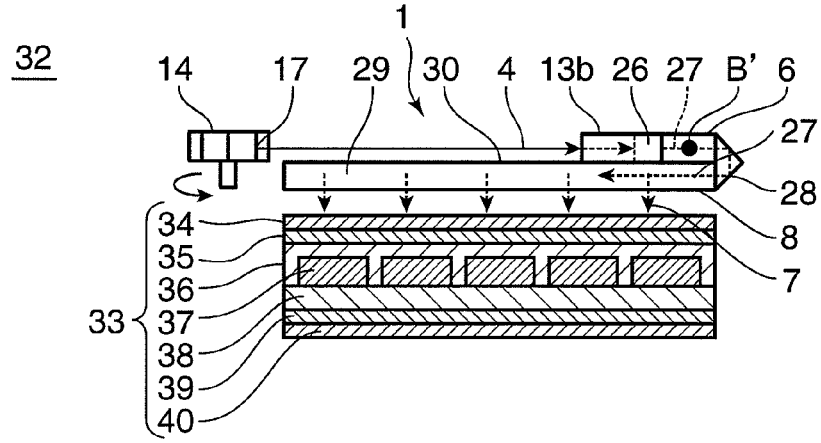
FIG. 6 is a diagram showing a schematic construction when viewed in a direction VI of FIG. 5 with a liquid crystal display panel shown in a schematic section.

FIG. 5 is a schematic construction diagram of a liquid crystal display device 32 using the surface illumination device 1 of FIG. 1 as a backlight illumination device when viewed from behind, and FIG. 6 is a diagram showing the schematic construction when viewed in a direction VI of FIG. 5 with a liquid crystal display panel 33 shown in a schematic section.

With reference to FIG. 5, the liquid crystal display device 32 is provided with the liquid crystal display panel 33 and a backlight illumination device for illuminating the liquid crystal display panel 33 from the back side of the panel, wherein the above surface illumination device 1 is used as this backlight illumination device.

As shown in FIG. 6, the emergent light 7 from the surface illumination device 1 passes through a color filter 38, a glass plate 39 and a polarizer 40 after passing through a polarizer 34 and a glass plate 35 of the liquid crystal display panel 33 and being modulated by a liquid crystal 36 and RGB pixels 37, thereby being displayed as an image of the liquid crystal display device 32.

By having such a construction, a thin and high-luminance liquid crystal display device capable of outputting lights having a substantially uniform luminance distribution in the scanning direction 23 can be realized.

Further, the laser light sources of the surface illumination device 1 include the light sources 3 for emitting at least red, green and blue laser lights 2 as shown in FIG. 5. By adopting such a construction for introducing the laser lights 2 from the light sources 3 to the scanning unit 5 along the common optical path 16 and further to the light guiding portion 6 as the scanning lights 4, a high-luminance liquid crystal display device with a wide color gamut can be realized.

Figure 7:
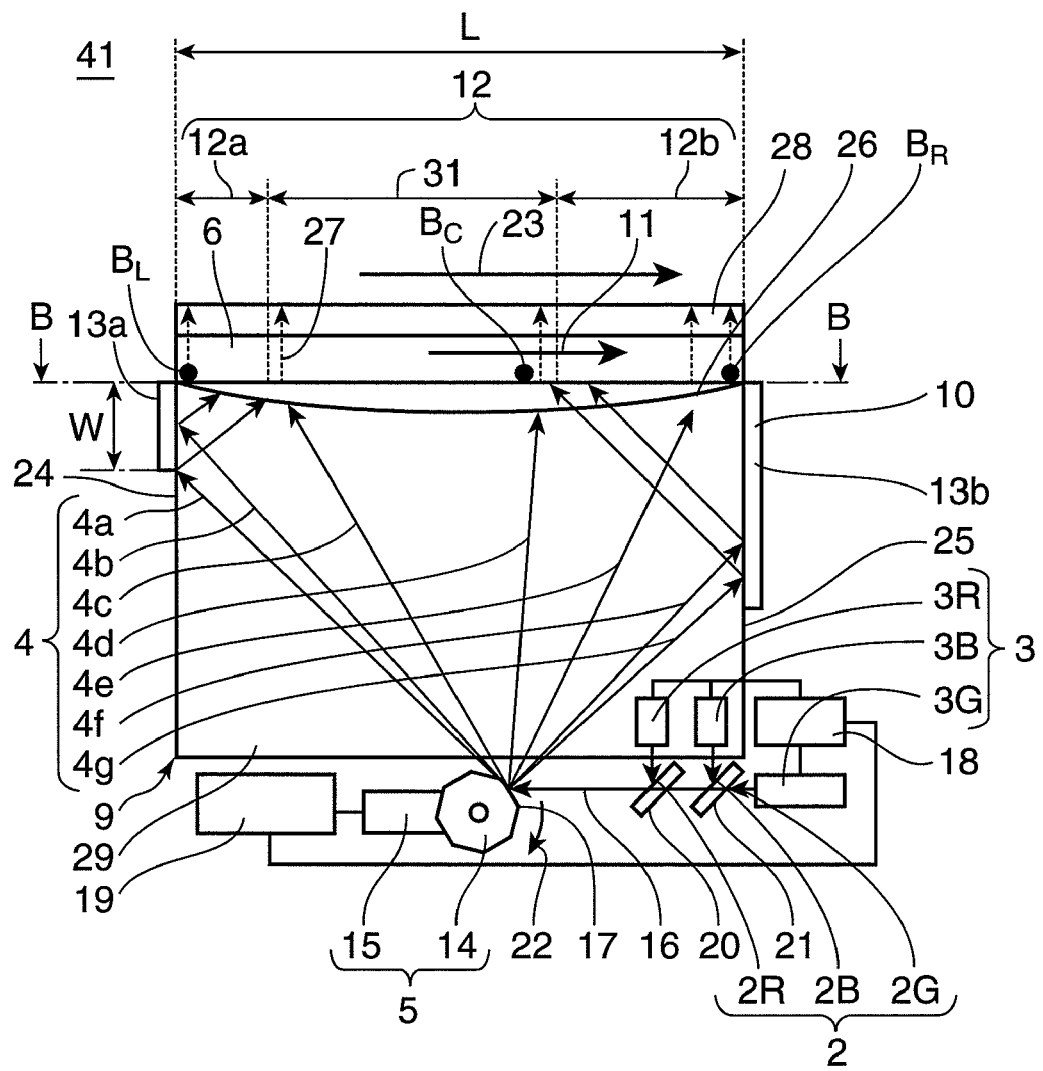
FIG. 7 is a schematic construction diagram showing a surface illumination device according to a modification of the first embodiment.

FIG. 7 is a schematic construction diagram showing a surface illumination device 41 according to a modification of the first embodiment. The surface illumination device 41 according to this modification changes a luminance distribution in the scanning direction 23 by partly changing the surface illumination device 1 of FIG. 1.

Specifically, in the surface illumination device 41, the longitudinal dimension of the light guiding plate 9 (longitudinal dimension L of the light guiding portion 6) is shortened as compared to the surface illumination device 1, whereby a distance between the polygonal mirror 14 and the reflection mirror 13b is shortened. Further, in the surface illumination device 41, the reflection mirror 13b is formed longer toward the polygonal mirror 14 as compared to the surface illumination device 1.

Figure 8:
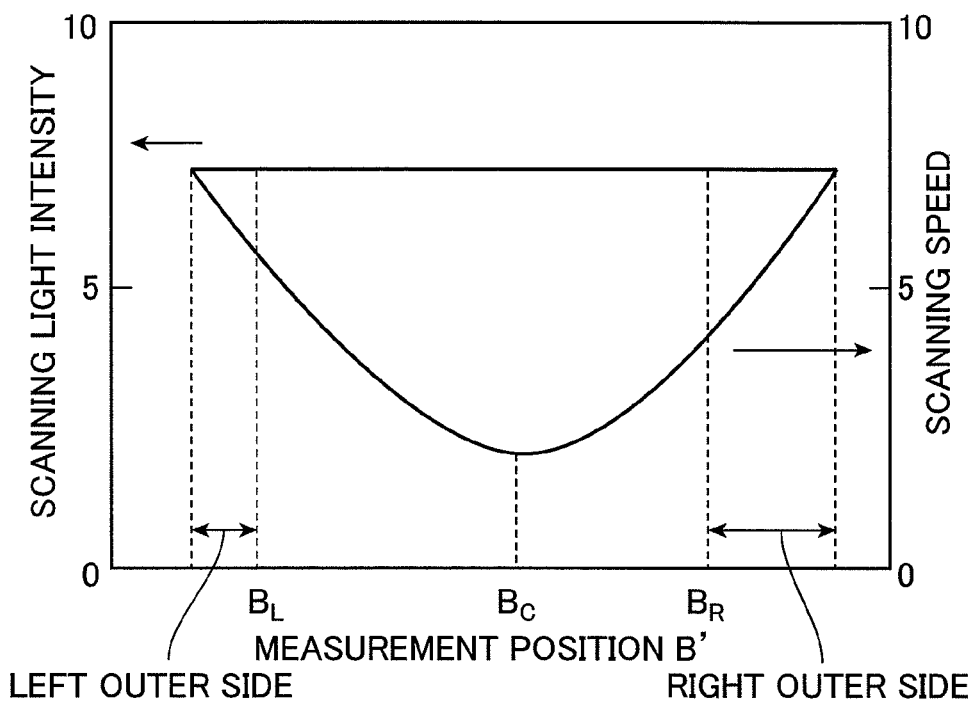
FIG. 8 is a graph showing a relationship between the scanning light intensities and the scanning speeds of scanning lights at measurement positions B' ($B_L$, $B_C$, $B_R$) of a light guiding portion in a section along B-B of FIG. 7.
Figure 9:
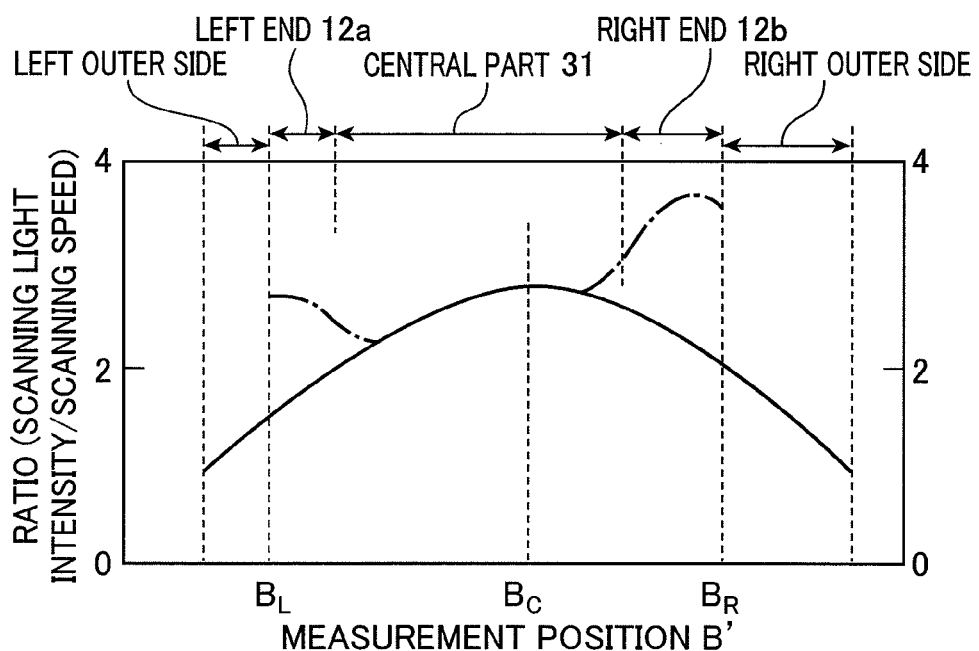
FIG. 9 is a graph showing ratios of the scanning light intensity and the scanning speed at the measurement positions B' of FIG. 7.

FIG. 8 is a graph showing a relationship between the scanning light intensities and the scanning speeds of the scanning lights 4 at measurement positions B' ($B_L$, $B_C$, $B_R$) of the light guiding portion 6 in a section along B-B of FIG. 7, and FIG. 9 is a graph showing ratios of the scanning light intensity and the scanning speed at the measurement positions B' of FIG. 7.

Since the distance between the polygonal mirror 14 and the reflection mirror 13b is shortened in the surface illumination device 41, the scanning speed at a turning position at the right side is slower as compared to FIG. 3. Accordingly, in the surface illumination device 41, the light intensities (solid line of FIG. 9) of the scanning lights 4c, 4d directly incident at the right end 12b from the polygonal mirror 13 are larger as in the case of FIG. 3 as shown in FIG. 9.

Further, since the reflection mirror 13b is elongated toward the polygonal mirror 14 in the surface illumination device 41, the scanning lights 4f and 4g that would propagate toward the right outer side of the light guiding plate 9 in the absence of this reflection mirror 13b can be introduced to the light guiding portion 6. Thus, according to the surface illumination device 41, the light intensity at the right range in the scanning direction 23, i.e. near the measurement position $B_R$ can be increased. As a result, the surface illumination device 41 having the light intensity at the right side of the principal surface 8 of the light guiding plate 9 enhanced can be realized as shown by dashed-dotted line in FIG. 9.

In the case of constructing a liquid crystal display device using such a surface illumination device 41, an image emphasized at a position corresponding to the measurement position $B_R$ of the surface illumination device 41 can be displayed. For example, if the above liquid crystal display device is installed at such a high position, e.g. outdoors that viewers look up, images easily visible without upper parts thereof becoming dark even when being seen from below can be displayed if a position corresponding to the measurement position $B_R$ is set at the upper side. Further, a simple construction of providing the reflection mirrors 13 can be adopted, and power consumption can be reduced by reducing the light intensity loss of the laser lights 2 by means of the reflection mirrors 13. The scanning range is narrower as compared to FIG. 1 in the surface illumination device 41. It goes without saying that the sizes of the respective constructions may be proportionally increases in the case of scanning over the same length as in FIG. 1.

Figure 10:
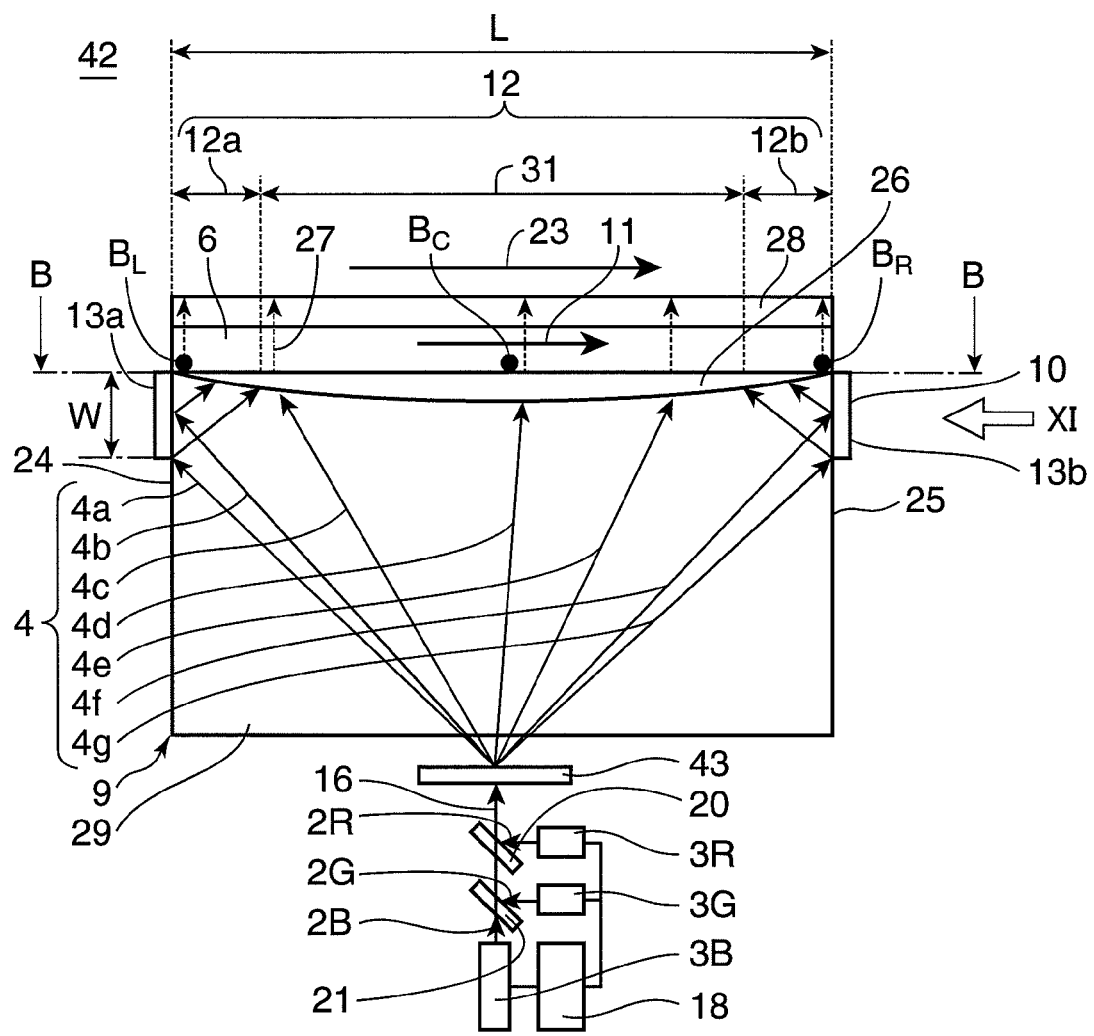
FIG. 10 is a schematic construction diagram showing a surface illumination device according to another modification of the first embodiment.
Figure 11:
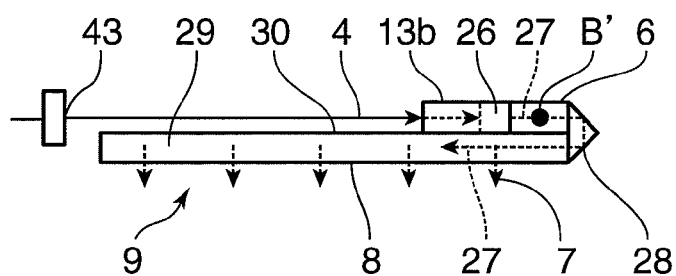
FIG. 11 is a diagram showing the construction of a side surface of a main part of the surface illumination device when viewed in a direction XI of FIG. 10.

Although the scanning lights 4 are incident on the light guiding portion 6 by way of the polygonal mirror 14 in the above embodiment, the construction for causing linear lights to be incident on the light guiding portion 6 is not limited to the polygonal mirror 14, and a line diffuser 43 as shown in FIGS. 10 and 11 may be employed.

FIG. 10 is a schematic construction diagram showing a surface illumination device 42 according to another modification of the first embodiment, and FIG. 11 is a diagram showing the construction of a side surface of a main part of the surface illumination device 42 when viewed in a direction XI of FIG. 10.

The line diffuser 43 is for linearly diffusing the laser lights 2 from the laser light sources 3 and irradiating them to the light guiding portion 6. Specifically, a cylindrical lens or a lenticular lens having a power in the longitudinal direction of the light guiding portion 6 is, for example, thought as the line diffuser 43. The cylindrical lens and the lenticular lens respectively have a function of linearly expanding the laser lights 2 from the laser light sources 3 along the longitudinal direction of the light guiding portion 6. However, the lenticular lens can more uniformly diffuse the laser lights 2 in the longitudinal direction of the light guiding portion 6 than the cylindrical lens.

Although not shown, it is also possible to scan the laser lights 2 by polarizing them using a galvanometer mirror in place of the polygonal mirror 14 or the line diffuser 43.

It is also possible to use the surface illumination devices 41, 42 in place of the surface illumination device 1 as the backlight of the liquid crystal display device 32 shown in FIG. 5. With such use, the liquid crystal display device 32 capable of making the light intensities of the laser lights 2 incident on the light guiding portion 6 substantially uniform in the longitudinal direction of the light guiding portion 6 or adjusting them to a specified light intensity distribution in the longitudinal direction can be realized. Further, since the surface illumination devices 41, 42 can introduce the laser lights 2, which would be lost in the absence of the reflection mirrors 13, to the light guiding portion 6, a liquid crystal display device having high laser light utilization efficiency can be realized.

The laser light sources of the surface illumination devices 41, 42 include the light sources 3 for emitting at least red, green and blue laser lights. By introducing the respective laser lights 2 from the laser light sources 3 to the scanning unit 5 or the line diffuser 43 along the common optical path to be incident on the light guiding portion 6, a high-luminance liquid crystal display device with a wide color gamut can be realized.

Second Embodiment

Figure 12:
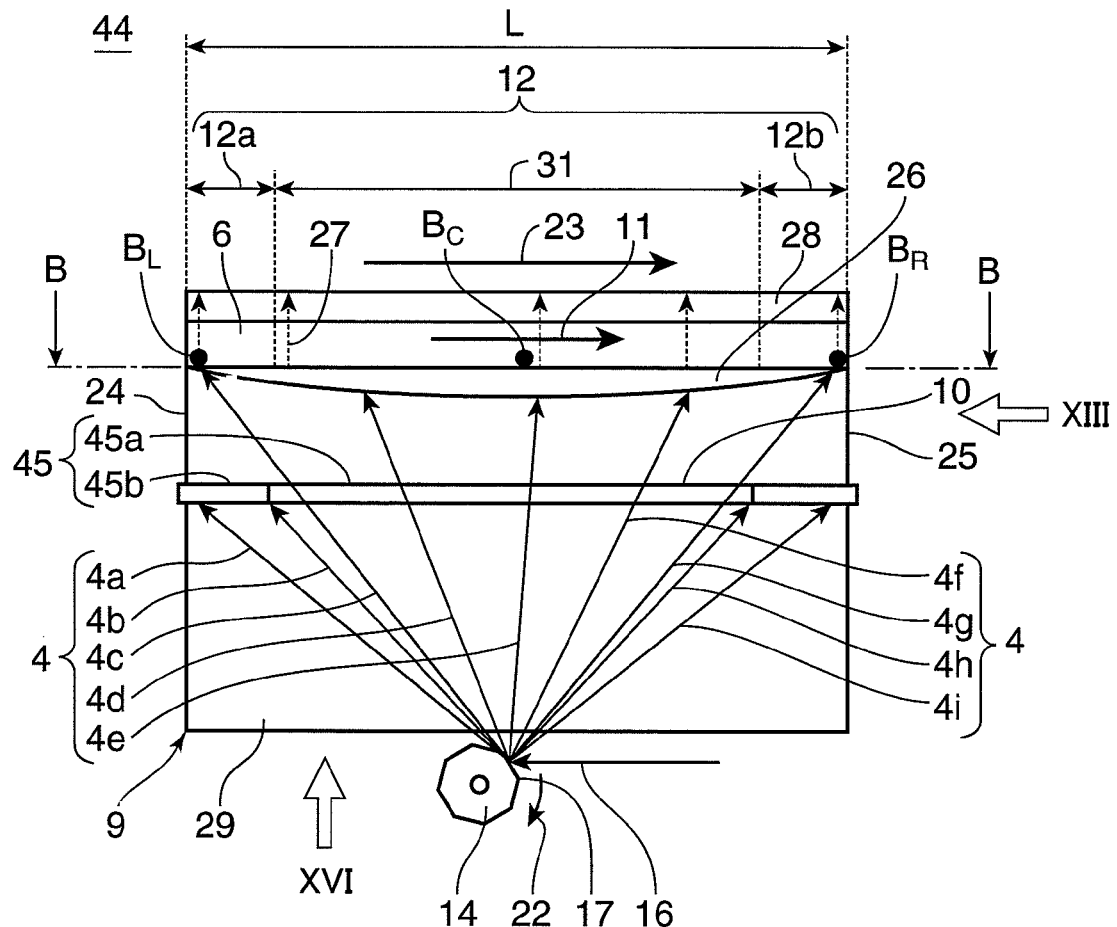
FIG. 12 is a schematic construction diagram of a surface illumination device according to a second embodiment of the invention when viewed from behind.
Figure 13:
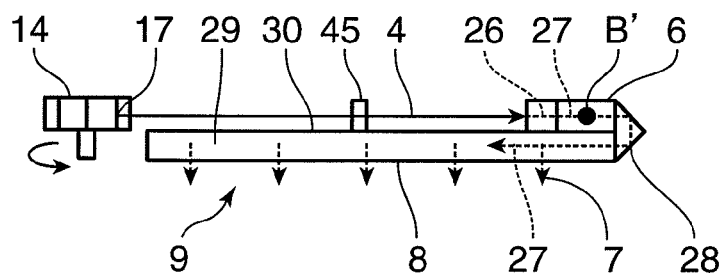
FIG. 13 is a side view of a main part when the surface illumination device of FIG. 12 is viewed in a direction XIII.

FIG. 12 is a schematic construction diagram of a surface illumination device 44 according to a second embodiment of the invention when viewed from behind, and FIG. 13 is a side view of a main part when the surface illumination device 44 of FIG. 12 is viewed in a direction XIII.

As shown in FIGS. 12 and 13, the surface illumination device 44 according to this embodiment differs from the surface illumination device 1 according to the first embodiment in that a lens 45 is used in place of the reflection mirrors 13 as a guiding member 10.

Specifically, the surface illumination device 44 of this embodiment includes the lens 45 arranged along the longitudinal direction 11 of the light guiding portion 6. A central region 45a corresponding to the central part 31 of the light guiding portion 6 and side regions 45b arranged at the opposite sides of the central region 45a are set in this lens 45. The central region 45a and the opposite side regions 45b have different lens characteristics.

Figure 14:
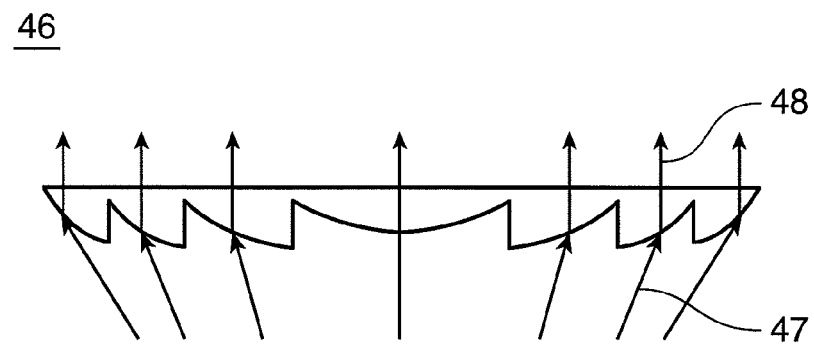
FIG. 14 is a schematic diagram showing a cylindrical Fresnel lens for converting a light from a point light source into a parallel light.

FIGS. 14 to 17 show specific examples of the lens 45 used in this embodiment. FIG. 14 is a schematic diagram showing a cylindrical Fresnel lens 46 for converting a light from a point light source into a parallel light. The cylindrical Fresnel lens 46 is formed to convert a radially spreading laser light 47 into a parallel laser light 48.

Figure 15:
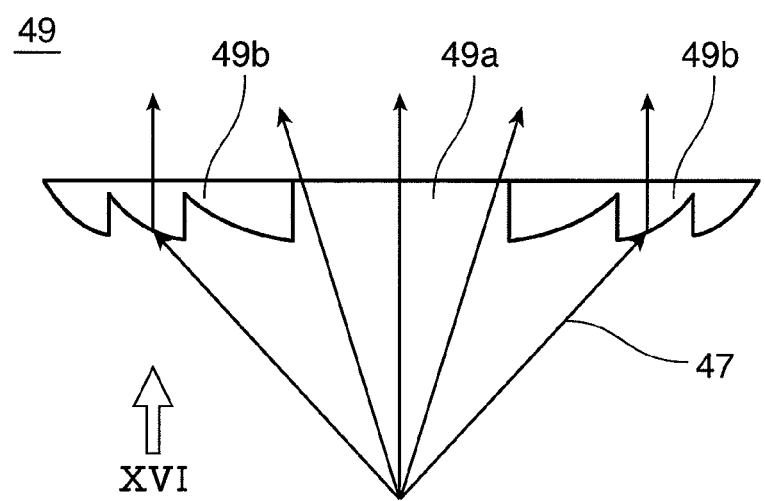
FIG. 15 is a diagram showing a lens, in which a central region is set as a clearance between lenses, as an example of a lens used in the surface illumination device of FIG. 12.
Figure 16:
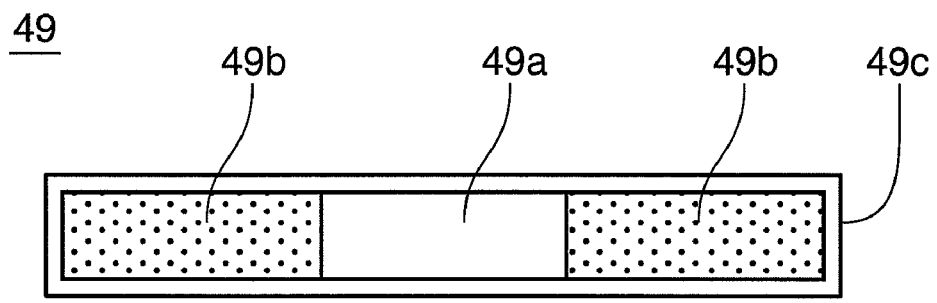
FIG. 16 is a diagram showing the construction of the lens when viewed in a direction XVI of FIG. 15.

FIG. 15 shows a lens 49, in which a central region 45a is set as a clearance 49a between lenses 49b, as an example of the lens 45 used in the surface illumination device 44 of FIG. 12. FIG. 16 diagrammatically shows the construction of the lens 49 when viewed in a direction XVI of FIG. 15.

With reference to FIGS. 15 and 16, the lens 49 includes a pair of left and right lenses 49b and an outer frame 49c into which these lenses 49b are fitted. The respective lenses 49b have a function equivalent to the one corresponding to the opposite side regions 45b (see FIG. 12) of the cylindrical Fresnel lens 46. Further, the respective lenses 49b are fitted into the outer frame 49c with the clearance 49a corresponding to the central region 45a defined therebetween. Accordingly, a laser light 47 propagates straight through the central region 45a (clearance 49a) without being converted, but is converted into a parallel laser light upon passing through the opposite side regions 45b (lenses 49b). Although the two lenses 49b are arranged to define the clearance 49a therebetween in the above description, a hole may be formed in a part corresponding to the central region 45a (see FIG. 12) of the cylindrical Fresnel lens 46.

Figure 17:
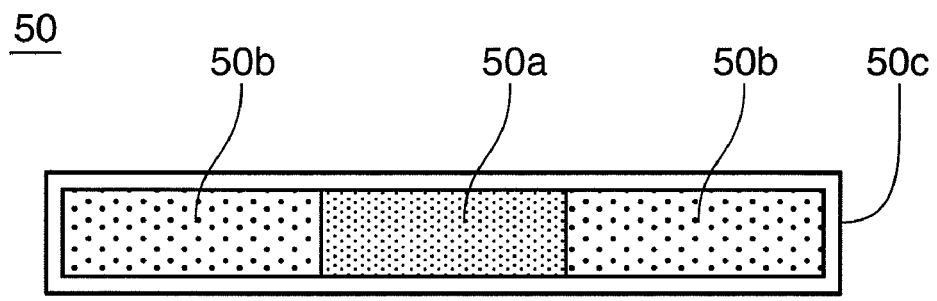
FIG. 17 is a schematic diagram showing another example of the lens used in the surface illumination device of FIG. 12.

FIG. 17 is a schematic diagram showing another example of the lens 45 used in the surface illumination device of FIG. 12. A lens 50 including a lens (passing portion) 50a, a pair of lenses 50b and an outer frame 50c as shown in FIG. 17 may also be employed. In this lens 50, the lens 50a is arranged in correspondence with the central region 45a and the respective lenses 50b are arranged in correspondence with the opposite side regions 45b. At this time, a transparent member having a lens power of 0 can be employed as the lens 50a.

Although the lenses 49, 50 are described, taking the cylindrical Fresnel lenses as examples, a lens constructed by fitting cylindrical lenses may also be used. Alternatively, another lens having an optical effect similar to these lenses may also be used.

Next, the operation of the surface illumination device 44 constructed as above is described, centered on differences from the surface illumination device 1. With reference to FIG. 12, laser lights 2 are reflected by mirror surfaces 17 of a polygonal mirror 14 to become scanning lights 4. If the polygonal mirror 14 rotates in a direction of an arrow 22, the scanning lights 4 are scanned along a scanning direction 23 in an order of 4a, 4b, 4c, 4d, 4e, 4f, 4g, 4h and 4i by the polygonal mirror 14.

Out of the scanning lights 4, the leftmost scanning light 4a has the propagation direction thereof bent in parallel with a left end 24 in the side region 45b of the lens 45 to be incident on the light guiding portion 6. The second leftmost scanning light 4b has the propagation direction thereof bent in parallel with the left end 24 by the lens 45 to be incident on the light guiding portion 6 similar to the scanning light 4a.

On the other hand, the scanning lights 4c, 4d, 4e, 4f and 4g directly incident on the light guiding portion 6 from the mirror surfaces 17 by way of the central region 45a of the lens 45, for example, have the propagation directions thereof bent by the cylindrical lens 26 to be incident on the light guiding portion 6 as scanning lights 27 parallel to the left end 24 and right end 25 of the light guiding plate 9.

The second rightmost scanning light 4h has the propagation direction thereof bent in parallel with the right end 25 in the side region 45b of the lens 45 to be incident on the light guiding portion 6. The rightmost scanning light 4i has the propagation direction thereof bent in parallel with the right end 25 by the side region 45b of the lens 45 to be incident on the light guiding portion 6. Since it is similar to the first embodiment that the scanning lights 27 are outputted as an emergent light 7 after passing through the light guiding plate 9, no description is given.

Figure 18:
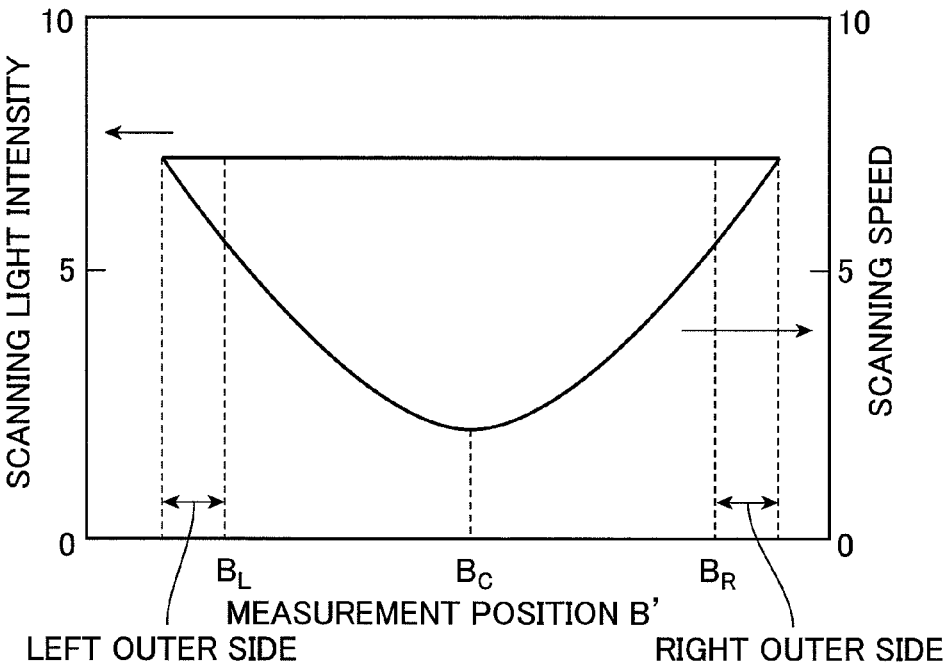
FIG. 18 is a graph showing a relationship between the scanning light intensities and the scanning speeds of scanning lights at measurement positions B' ($B_L$, $B_C$, $B_R$) of a light guiding portion in a section along B-B of FIG. 12.
Figure 19:
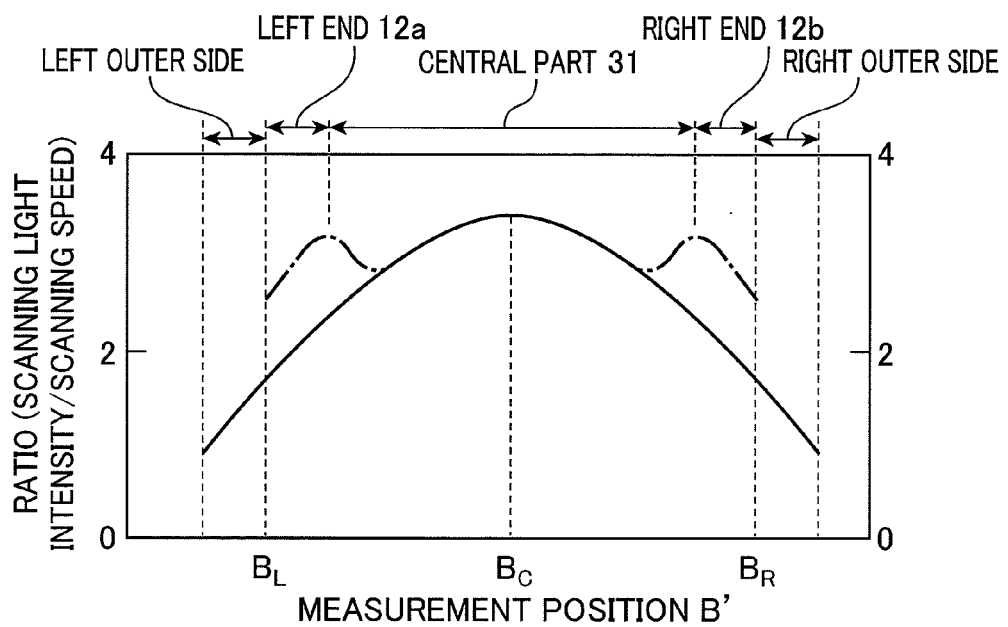
FIG. 19 is a graph showing ratios of the scanning light intensity and the scanning speed at the measurement positions B'.

FIG. 18 is a graph showing a relationship between the scanning light intensities and the scanning speeds of the scanning lights 4 at measurement positions B' ($B_L$, $B_C$, $B_R$) of the light guiding portion 6 in a section along B-B of FIG. 12, and FIG. 19 is a graph showing ratios of the scanning light intensity and the scanning speed at the measurement positions B'. It should be noted that the scanning light intensities and the scanning speeds are expressed by arbitrary units.

In the case of rotating the polygonal mirror 14 at a constant speed, a scanning speed determined by this polygonal mirror 14 and the mirror surfaces 17 is represented by a curve as shown in FIG. 18 with respect to the measurement positions B'. In other words, the representing curve is such that the scanning speed is maximized at the measurement position $B_L$ near the left end 24 of the light guiding plate 9 and at the measurement position $B_R$ near the right end 25 while being minimized at a central part $B_C$ of the light guiding plate 9. On the other hand, in the case of making the light intensities of the laser lights 2 constant, the light intensities of the scanning lights 4 are also constant. Thus, the scanning light intensities at the measurement positions B' are presented by a straight line as shown in FIG. 18. Therefore, a ratio of the scanning light intensity to the scanning speed per unit length of the light guiding portion 6 in the scanning direction 23 is large in a central part 31 of the light guiding plate 9 and small at opposite ends 12 (12a, 12b) of the light guiding plate 9 as shown by a solid-line curve in FIG. 19.

Here, in the absence of the lens 45 arranged at the left end 24 and right end 25 of the light guiding plate 9, the scanning lights 4a, 4b, 4h and 4i propagate toward the left and right outer sides of the light guiding plate 9. Thus, the light intensities of the laser lights lost at the left and right outer sides of the light guiding plate 9 are represented by sections defined between broken lines in FIGS. 18 and 19. On the other hand, if the lens 45 is arranged as in this embodiment, the scanning lights 4a, 4b, 4h and 4i are reflected by the lens 45 to be introduced to the light guiding portion 6. Accordingly, the ratios of the scanning light intensity to the scanning speed of the scanning lights 4 in this embodiment increase at the left end 12a and right end 12b as shown by dashed-dotted line in FIG. 19, thereby being made substantially uniform in the longitudinal direction 11 of the light guiding portion 6. The unevenness of the light intensity distribution shown in FIG. 19 becomes smaller as the scanning lights 27 propagate through the light guiding plate 9, whereby the light intensity distribution on a principal surface 8 of a light guiding plate main body 29 is made uniform to a certain degree.

By having such a construction, the laser lights, which would propagate to the outside of the light guiding portion 6 to be lost in the absence of the lens 45, can be efficiently introduced to the light guiding portion 6. Accordingly, the surface illumination device 44 with lower power consumption can be realized since the laser lights 2 can be efficiently utilized. Although the luminance distribution in the longitudinal direction 11 normally decreases at the scanning ends, the light intensities of the scanning lights 4 incident on the light guiding portion 6 can be made substantially uniform in the longitudinal direction by adding the light intensities of the laser lights, which would be lost in the absence of the lens 45.

Generally, in order to cause laser lights to scan an incident surface with uniform light intensity, a lens having a plurality of curved surfaces such as an fθ lens needs to be used. However, the construction including the lens 45 as in this embodiment can be very inexpensive.

Further, since the scanning lights having different optical paths are incident on the light guiding portion 6 in this embodiment, the emergent light 7 outputted from the principal surface 8 of the surface illumination device 44 has only a suppressed level of speckle noise.

The intensities of lights incident on the opposite ends 12 can be adjusted by sliding the lens 45 in an optical axis direction of the laser lights 2. Then, the luminance distribution of the laser lights 2 incident on the light guiding portion 6 can also be adjusted by sliding the line 45.

It is also possible to use the surface illumination device 44 in place of the surface illumination device 1 as the backlight of the liquid crystal display device 32 shown in FIG. 5. With such use, the liquid crystal display device 32 capable of making the light intensities of the laser lights 2 incident on the light guiding portion 6 substantially uniform in the longitudinal direction of the light guiding portion 6 or adjusting them to a specified light intensity distribution in the longitudinal direction can be realized. Further, since the surface illumination device 44 can introduce the laser lights 2, which would be lost in the absence of the lens 45, to the light guiding portion 6, a liquid crystal display device having high laser light utilization efficiency can be realized.

The laser light sources of the surface illumination device 44 include the light sources 3 for emitting at least red, green and blue laser lights. By introducing the respective laser lights 2 from the laser light sources 3 to the polygonal mirror 14 along the common optical path to be incident on the light guiding portion 6, a high-luminance liquid crystal display device with a wide color gamut can be realized.

Third Embodiment

Figure 20:
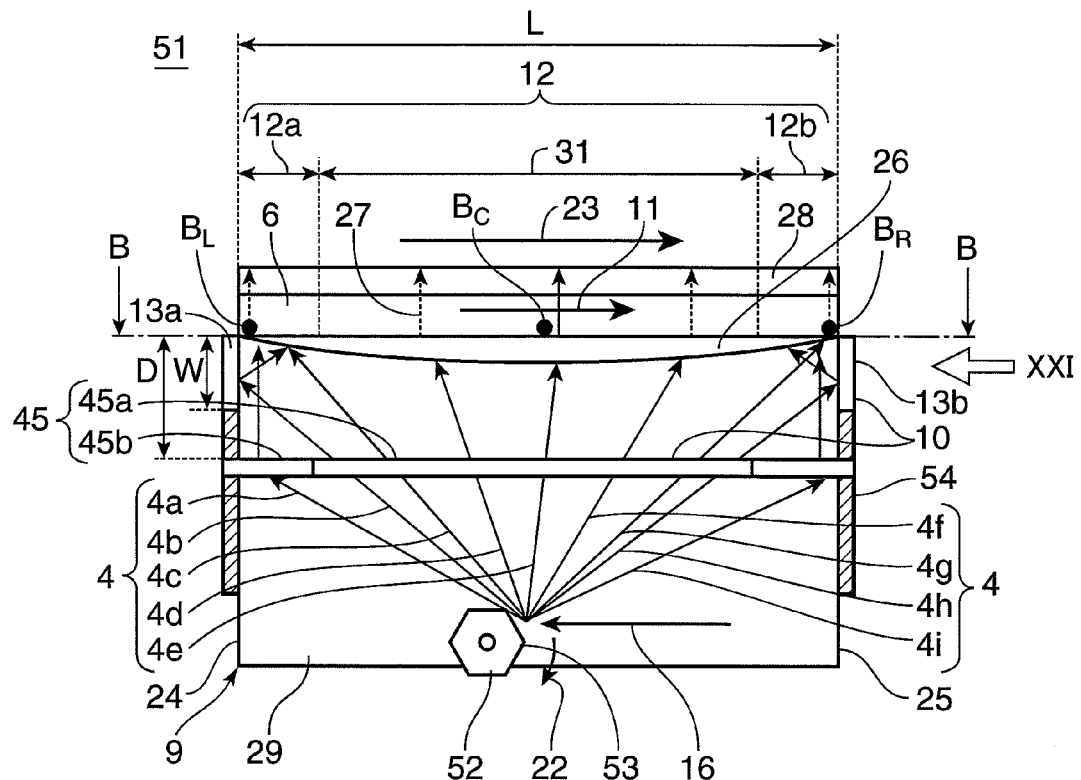
FIG. 20 is a schematic construction diagram of a surface illumination device according to a third embodiment of the invention when viewed from behind.
Figure 21:
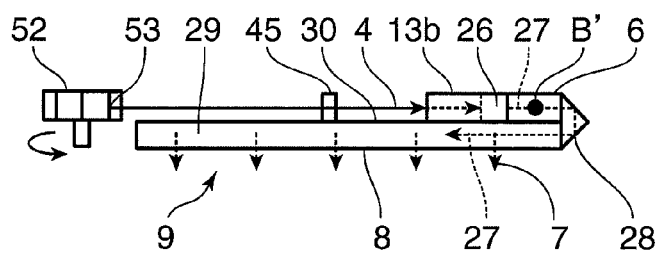
FIG. 21 is a side view of a main part of the surface illumination device when viewed in a direction XXI of FIG. 20.

FIG. 20 is a schematic construction diagram of a surface illumination device 51 according to a third embodiment of the invention when viewed from behind, and FIG. 21 is a side view of a main part of the surface illumination device when viewed in a direction XXI of FIG. 20.

As shown in FIGS. 20 and 21, the surface illumination device 51 differs from the surface illumination devices 1, 44 according to the first and second embodiments in that both the reflection mirror 13 (13a, 13b) and the lens 45 are provided as a guiding member 10 between a light guiding portion 6 and a polygonal mirror 52 constituting the scanning unit.

The surface illumination device 51 also differs from the above embodiments in that the polygonal mirror 52 having a hexagonal shape is employed instead of the polygonal mirror 14 having an octagonal shape according to the above embodiments. By widening a scan angle per one surface of the polygonal mirror 52 in this way to narrow a distance between the polygonal mirror 52 and the light guiding portion 6, the entire surface illumination device 51 has a compact construction.

The surface illumination device 51 further includes an adjusting mechanism 54 for adjusting a distance D between the lens 45 and the light guiding portion 6. This adjusting mechanism 54 is disposed at a position below the leading ends of the reflection mirrors 13. The adjusting mechanism 54 is so constructed as to electrically drive the lens 45 in a direction perpendicular to the light guiding portion 6 by means of a controller (not shown) having a built-in power supply.

Figure 22:
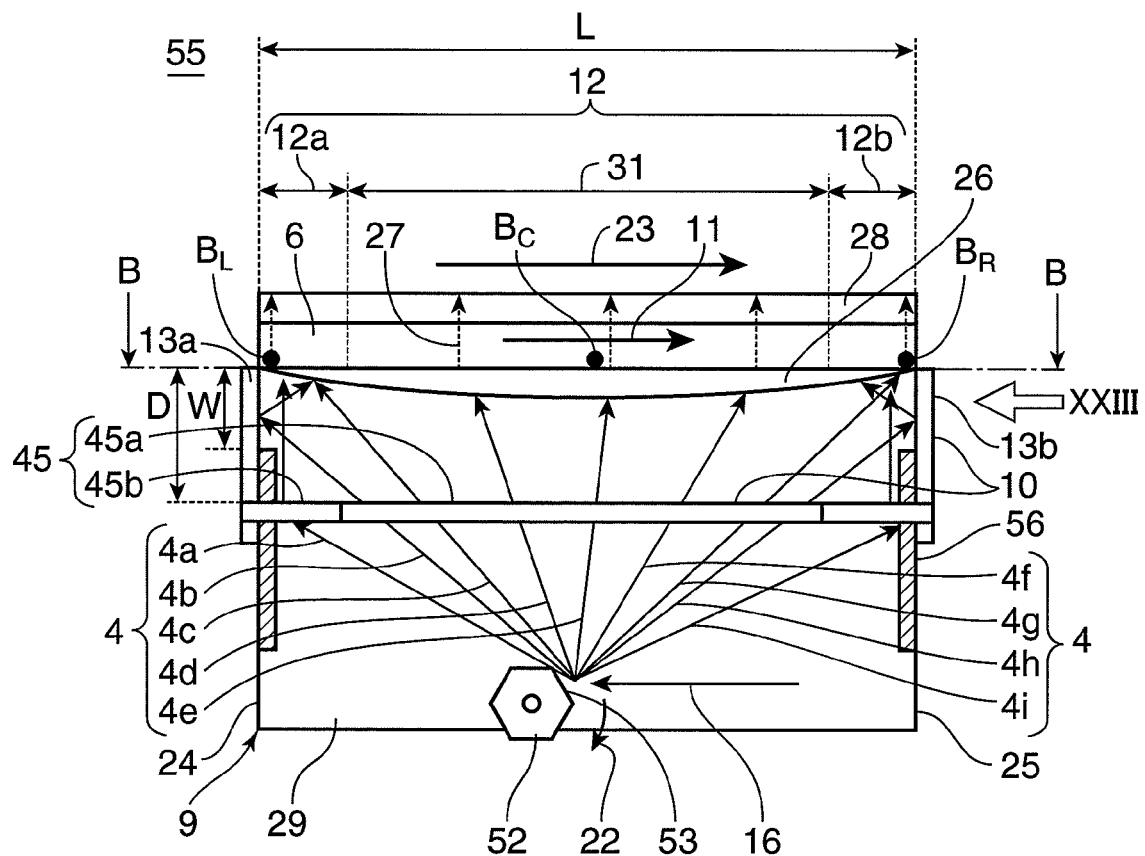
FIG. 22 is a schematic construction diagram showing a modification of the surface illumination device according to the third embodiment of the invention.
Figure 23:
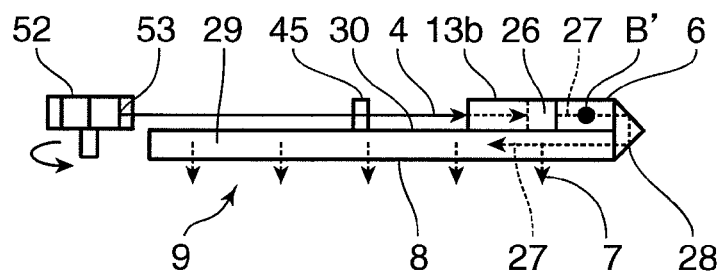
FIG. 23 is a side view of a main part of the surface illumination device when viewed in a direction XXIII of FIG. 22.

On the other hand, a surface illumination device 55 shown as a modification in FIGS. 22 and 23 includes an adjusting mechanism 56 in place of the adjusting mechanism 54. This adjusting mechanism 56 is arranged at positions more inward of the reflection mirrors 13 and different from the reflection mirrors 13 in height direction. Accordingly, the blocking of laser lights introduced to the reflection mirrors 13 by the adjusting mechanism 56 is suppressed. Since the other construction of the surface illumination device 56 is similar to the surface illumination device 51 shown in FIGS. 21 and 22, the construction of the surface illumination device 56 shown in FIGS. 22 and 23 is described below.

In FIG. 22, the guiding member 10 includes the reflection mirrors 13 (13a, 13b) extending from opposite ends 12 (12a, 12b) of the light guiding portion 6 in a direction perpendicular to the longitudinal direction 11 of the light guiding portion 6 and the lens 45. In other words, the guiding member 10 of this embodiment is a combination of those of the first and second embodiments.

The lens 45 is arranged along the longitudinal direction 11 of the light guiding portion 6 similar to the above embodiment. The central region 45a corresponding to a central part 31 of the light guiding portion 6 and the opposite side regions 45b having a lens characteristic different from that of the central region 45a are set in the lens 45.

Next, the operation of the surface illumination device 55 constructed as above is described, centered on differences from the above embodiments. If the polygonal mirror 52 rotates in a direction of an arrow 22 as shown in FIG. 22, scanning lights 4 are scanned from left to right in an order of 4a, 4b, 4c, 4d, 4e, 4f, 4g, 4h and 4i along the longitudinal direction 11 of the light guiding portion 6 by the polygonal mirror 52.

Out of the scanning lights 4, the leftmost scanning light 4a has the propagation direction thereof bent in parallel with a left end 24 of a light guiding plate 9 by the cylindrical Fresnel lens fitted in the side region 45b of the lens 45 to be incident on a light guiding portion 6. The scanning light 4b passes through the central region 45a of the lens 45 and is reflected by the reflection mirror 13a arranged along the left end 24 of the light guiding plate 9 to be incident on the light guiding portion 6 in an oblique direction.

On the other hand, the scanning lights 4c, 4d, 4e, 4f and 4g are directly incident on the light guiding portion 6 from mirror surfaces 53 by way of the central region 45a of the lens 45. Since a cylindrical lens 26 is arranged before the light guiding portion 6 in this embodiment, the scanning lights 4c, 4d, 4e, 4f and 4g have the propagation directions thereof bent by the cylindrical lens 26 to be incident on the light guiding portion 6 as scanning lights 27 parallel to the left end 24 and right end 25 of the light guiding plate 9.

The scanning light 4h passes through the central region 45a of the lens 45 and is reflected by the reflection mirror 13b arranged at the right end 25 of the light guiding plate 9 to be incident on the light guiding portion 6. The scanning light 4i scanned at the rightmost side has the propagation direction thereof bent in parallel with the right end 25 by the cylindrical Fresnel lens fitted in the side region 45b of the lens 45 to be incident on the light guiding portion 6.

The scanning lights 27 incident on the light guiding portion 6 propagate through the light guiding plate 9 to be outputted as an emergent light 7 similar to the first and second embodiments. As also described in the first embodiment, the cylindrical lens 26 is used to cause the scanning lights 4 to be incident on the light guiding portion 6 in the direction perpendicular to the scanning direction 23, but any one of a toric lens, a Fresnel lens and a diffractive optical element may also be used. Further, the cylindrical lens 26 may be omitted depending on the angles and beam diameters of the scanning lights 4 incident on the light guiding portion 6 and a diffused state in a light guiding plate main body 29. If the cylindrical lens 26 is omitted, an end surface of the light guiding portion 6 serves as an incident surface, on which the scanning lights 4 are incident.

Out of the scanning lights 4 scanned over a wide range by the polygonal mirror 52, the scanning lights 4a, 4b, 4h and 4i would be lost without being incident on the light guiding portion 6 unless the reflection mirrors 13 and the lens 45 should be arranged. In the surface illumination device 55 according to this embodiment, most of the light intensities of the scanning lights 4, which would be lost, are incident on the light guiding portion 6 and outputted as part of the emergent light 7 from the light guiding plate 9 by arranging the reflection mirrors 13 and the lens 45.

Figure 24:
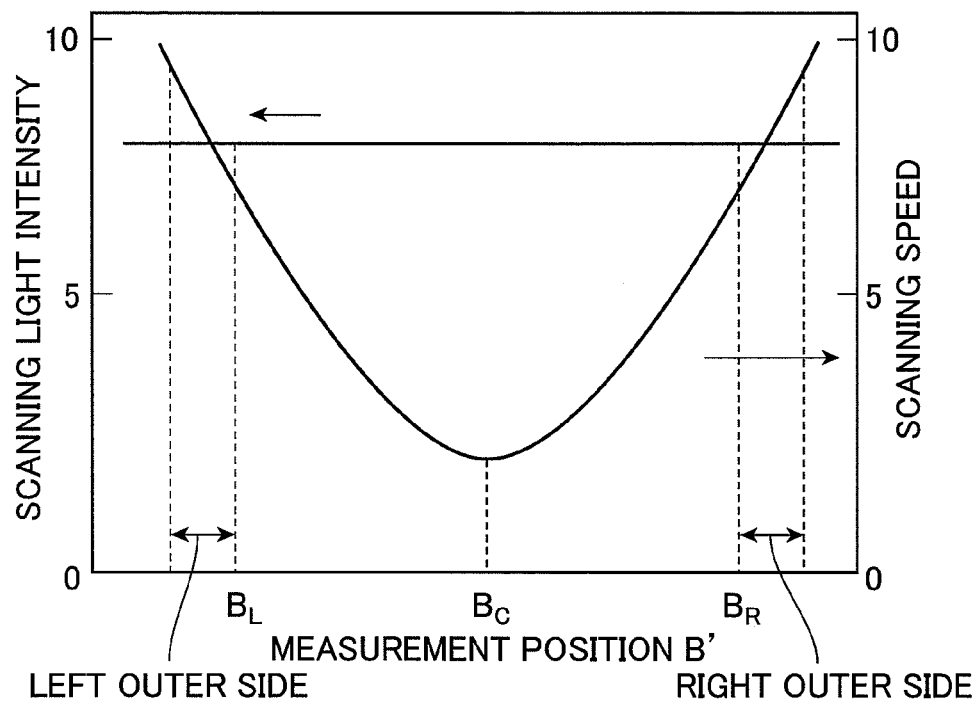
FIG. 24 is a graph showing a relationship between the scanning light intensities and the scanning speeds of scanning lights at measurement positions B' ($B_L$, $B_C$, $B_R$) of a light guiding portion in a section along B-B of FIG. 22.
Figure 25:
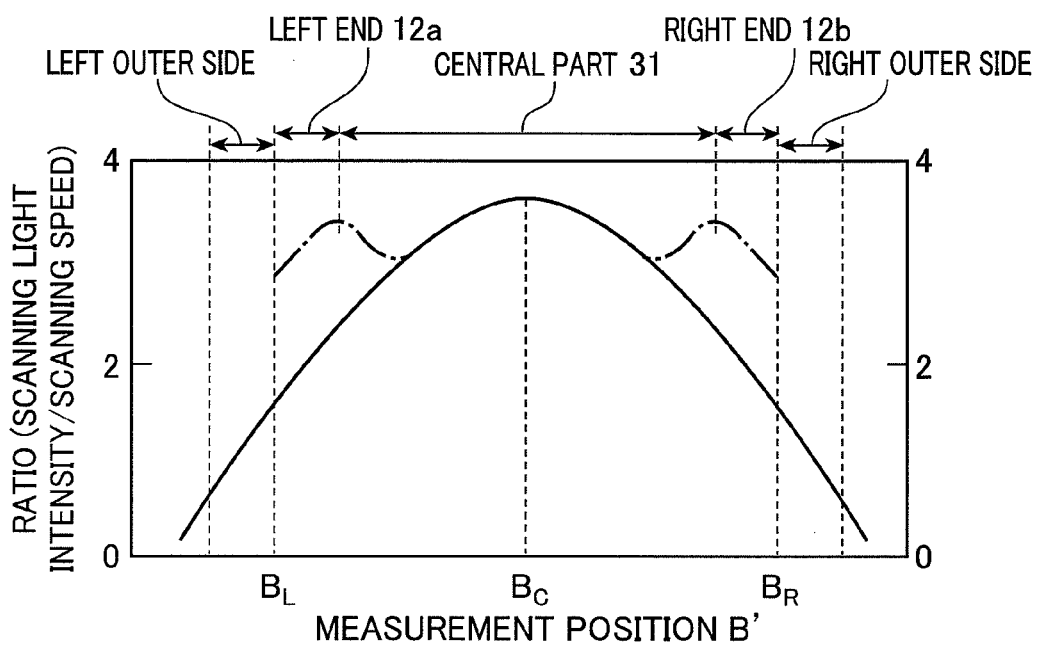
FIG. 25 is a graph showing ratios of the scanning light intensity and the scanning speed at the measurement positions B'.

FIG. 24 is a graph showing a relationship between the scanning light intensities and the scanning speeds of the scanning lights 4 at measurement positions B' ($B_L$, $B_C$, $B_R$) of the light guiding portion 6 in a section along B-B of FIG. 22, and FIG. 25 is a graph showing ratios of the scanning light intensity and the scanning speed at the measurement positions B'. It should be noted that the scanning light intensities and the scanning speeds are expressed by arbitrary units.

A curve shown by solid line in FIG. 25 represents the ratio of the scanning light intensity and the scanning speed in a state where the guiding member 10 is not arranged, whereas curves shown by dashed-dotted line in FIG. 25 represent the ratio of the scanning light intensity and the scanning speed near the left end 12a and right end 12b in a state where the guiding member 10 is arranged.

As described above, the scanning lights 4 (scanning lights 4b and 4h in FIG. 22) propagating toward the left and right outer sides of the light guiding portion 6 are reflected by the reflection mirrors 13a, 13b to be introduced to the left end 12a and right end 12b of the light guiding portion 6. The scanning lights 4 (scanning lights 4a and 4i in FIG. 22) propagating toward the further outer sides of the light guiding portion 6 are refracted by the lens 45 to be introduced to the left end 12a and right end 12b of the light guiding portion 6. As a result of these, it can be understood that the scanning light intensity increases near the left end 12a and right end 12b of the light guiding portion 6 as shown by dashed-dotted line in FIG. 25. The unevenness of the light intensity distribution shown in FIG. 25 becomes smaller as the scanning lights 27 propagate through the light guiding plate 9, whereby the light intensity distribution on the principal surface 8 of the light guiding plate main body 29 is made uniform to a certain degree.

According to this embodiment, since the distance between the polygonal mirror 52 and the light guiding portion 6 can be narrowed due to the use of the polygonal mirror 52 having a smaller number of reflecting surfaces and a larger scan angle, the miniaturization of the surface illumination devices 51, 55 can be promoted.

Further, since the scanning lights 4, which would propagate to the outside of the light guiding portion 6 in the absence of the guiding member 10, can be introduced to the light guiding portion 6 similar to the first and second embodiments, power consumption can be reduced while the loss of the laser lights 2 is suppressed.

Furthermore, luminance normally decreases at the scanning ends in the luminance distribution in the longitudinal direction 11 of the light guiding portion 6. On the contrary, in this embodiment, the light intensities of the scanning lights 4 can be added as those at the scanning ends by introducing the scanning lights 4, which would be lost in the absence of the guiding member 10, to the left and right ends 12 of the light guiding portion 6, wherefore luminance can be made uniform in the longitudinal direction of the light guiding portion 6.

Hence, according to this embodiment, further miniaturization as compared to the above embodiments can be realized and power consumption can be reduced by efficiently utilizing the scanning lights 4 by introducing them to the light guiding portion 6 without losing them.

Generally, in order to cause the laser lights to scan the incident surface with uniform light intensity, a lens having a plurality of curved surfaces such as an fθ lens needs to be used. However, the construction using the reflection mirrors 13 and the lens 45 as in this embodiment can be very inexpensive.

Further, since the scanning lights 4 having different optical paths are incident on the light guiding portion 6 in this embodiment, the emergent light 7 outputted from the principal surface 8 of the light guiding plate 9 has only a suppressed level of speckle noise.

In this embodiment, a desired light intensity distribution in the longitudinal direction of the light guiding portion 6 can be obtained by adjusting the position of the lens 45 by means of the adjusting mechanism 56 and determining the size and arrangement of the reflection mirrors 13 beforehand. This point is described with reference to FIGS. 26 and 27 below.

Figure 26:
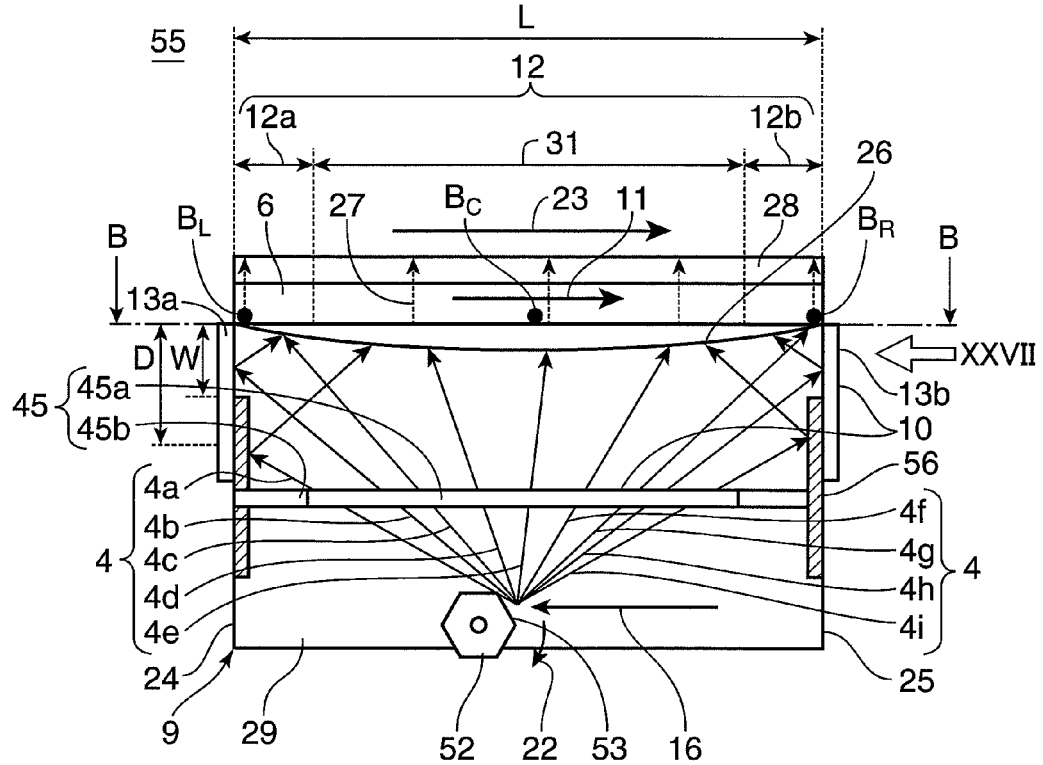
FIG. 26 is a schematic construction diagram showing a state where a lens of the surface illumination device shown in FIG. 22 is moved toward a polygonal mirror.
Figure 27:
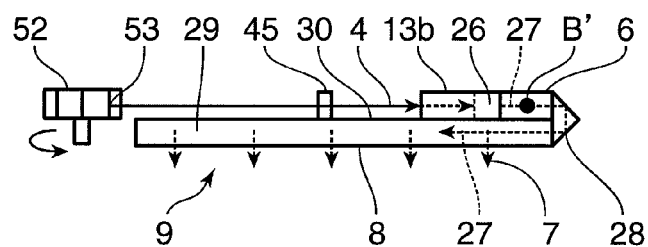
FIG. 27 is a side view when viewed in a direction XXVII of FIG. 26.

FIG. 26 is a schematic construction diagram showing a state where the lens 45 of the surface illumination device 55 shown in FIG. 22 is moved toward the polygonal mirror 52, and FIG. 27 is a side view when viewed in a direction XXVII of FIG. 26.

In the state shown in FIG. 26, the lens 45 is slid toward the polygonal mirror 52 as compared to the state shown in FIG. 22. Accordingly, the scanning lights 4a, 4i incident on the left and right ends 12a, 12b of the light guiding portion 6 after being incident on the opposite side regions 45b of the lens 45 in the state shown in FIG. 22 can be reflected by the reflection mirrors 13a, 13b in the state shown in FIG. 26. Thus, in the state shown in FIG. 26, the scanning lights 4a, 4i can be incident at inner positions of the light guiding portion 6 as compared to the state of FIG. 22, wherefore the light intensities of the scanning lights 4 incident at inner positions of the light guiding portion 6 can be increased without increasing power consumption. Since a central part of the light guiding plate 9 can be illuminated brighter in the state of FIG. 26 in this way, image with excellent visibility can be displayed without varying power consumption if this surface illumination device 55 is used, for example, as a backlight of a liquid crystal display device. This point is described below.

Figure 28:
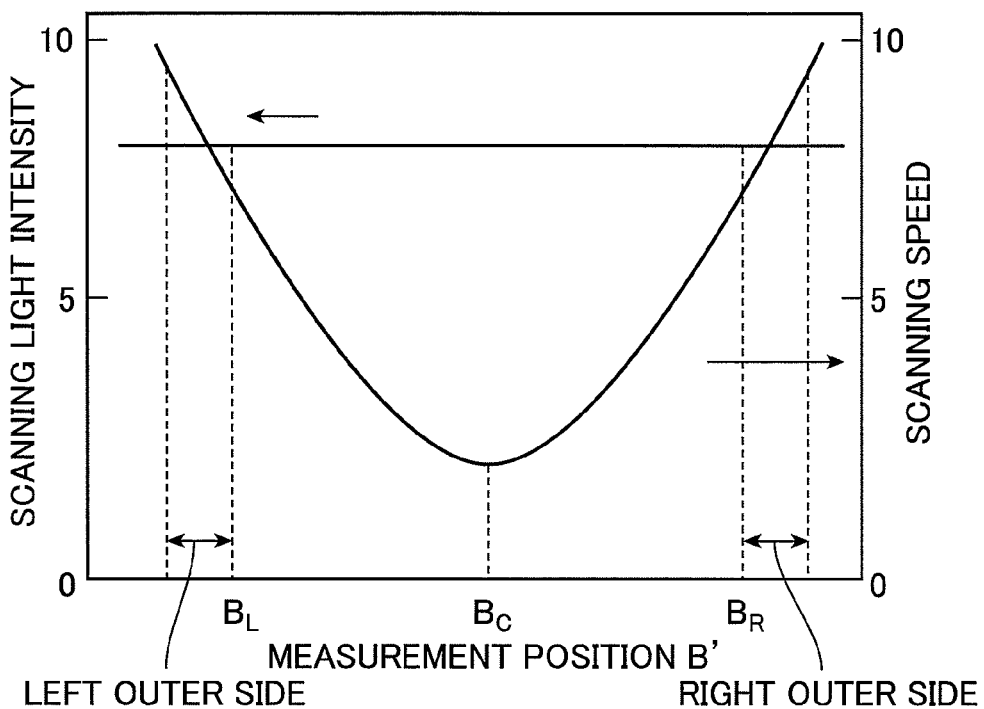
FIG. 28 is a graph showing a relationship between the scanning light intensities and the scanning speeds of scanning lights at measurement positions B' ($B_L$, $B_C$, $B_R$) of a light guiding portion in a section along B-B of FIG. 26.
Figure 29:
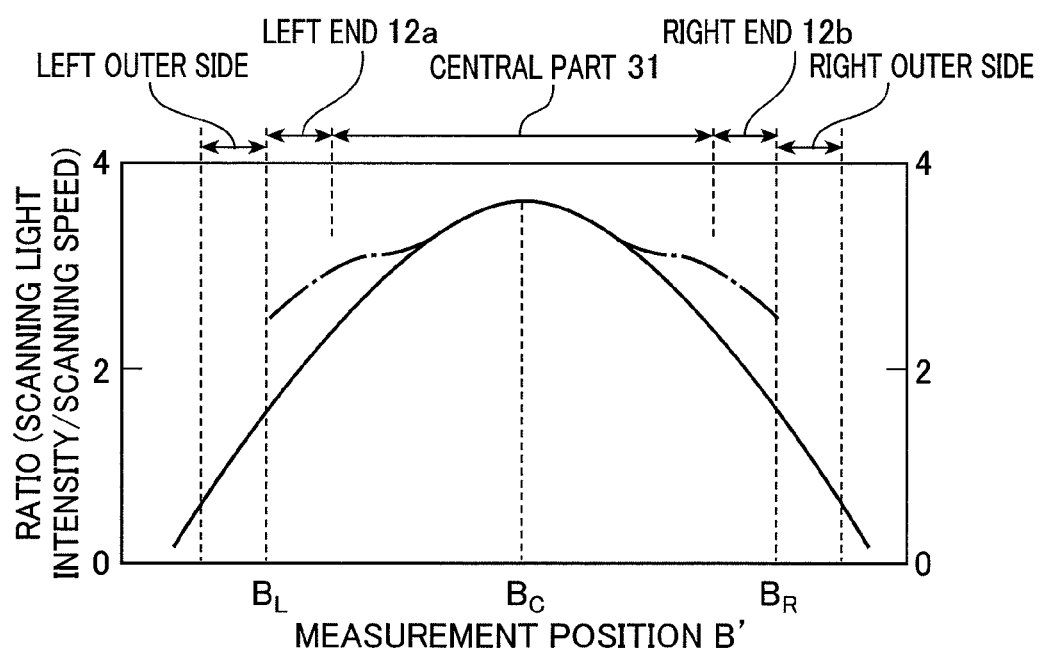
FIG. 29 is a graph showing ratios of the scanning light intensity and the scanning speed at the measurement positions B' of FIG. 26.

FIG. 28 is a graph showing a relationship between the scanning light intensities and the scanning speeds of scanning lights 4 at measurement positions B' ($B_L$, $B_C$, $B_R$) of the light guiding portion 6 in a section along B-B of FIG. 26, and FIG. 29 is a graph showing ratios of the scanning light intensity and the scanning speed at the measurement positions B' of FIG. 26.

If the lens 45 is movably constructed as in the above embodiment, a user can arbitrarily adjust a state according to images to be displayed using a remote controller between an illuminated state with substantially uniform luminance in the entire areas of images, for example, as shown in FIGS. 22 and 23 and an illuminated state with relatively increased center luminance as shown in FIGS. 26 to 29. Of course, the lens 45 can be also constructed such that the position thereof is automatically adjusted according to the contents of screens to be displayed and video contents. For example, the position of the lens 45 can be adjusted such that the luminance in the central part to be watched is increased in the case of movies and the entire luminance is made uniform to enable the entire screen to be watched in the case of sports.

Although the construction for generating the scanning lights 4 using the polygonal mirror 52 and causing the scanning lights 4 to be incident on the light guiding portion 6 is illustrated in FIGS. 20 to 27, the line diffuser 43 may also be used as shown in FIG. 10 in place of the polygonal mirror 52 similar to the above embodiments. In other words, the laser lights 2 may be linearly diffused by the line diffuser 43 to be irradiated to the light guiding portion 6.

In this case, a cylindrical lens or a lenticular lens having a power in the longitudinal direction of the light guiding portion 6 is, for example, used as the line diffuser 43. The cylindrical lens and the lenticular lens respectively have a function of linearly expanding the laser lights 2 from the laser light sources 3 along the longitudinal direction of the light guiding portion 6. However, the lenticular lens can more uniformly diffuse the laser lights 2 in the longitudinal direction of the light guiding portion 6 than the cylindrical lens.

Although not shown, it is also possible to scan the laser lights 2 by polarizing them using a galvanometer mirror in place of the polygonal mirror 52 or the line diffuser 43.

It is also possible to use the surface illumination devices 51, 55 in place of the surface illumination device 1 as the backlight of the liquid crystal display device 32 shown in FIG. 5. With such use, the liquid crystal display device 32 capable of making the light intensities of the laser lights 2 incident on the light guiding portion 6 substantially uniform in the longitudinal direction of the light guiding portion 6 or adjusting them to a specified light intensity distribution in the longitudinal direction can be realized.

The laser light sources of the surface illumination devices 51, 55 include the light sources 3 for emitting at least red, green and blue laser lights. By introducing the respective laser lights 2 from the laser light sources 3 to the polygonal mirror 52 or the line diffuser 43 along the common optical path to be incident on the light guiding portion 6, a high-luminance liquid crystal display device with a wide color gamut can be realized.

Fourth Embodiment

Figure 30:
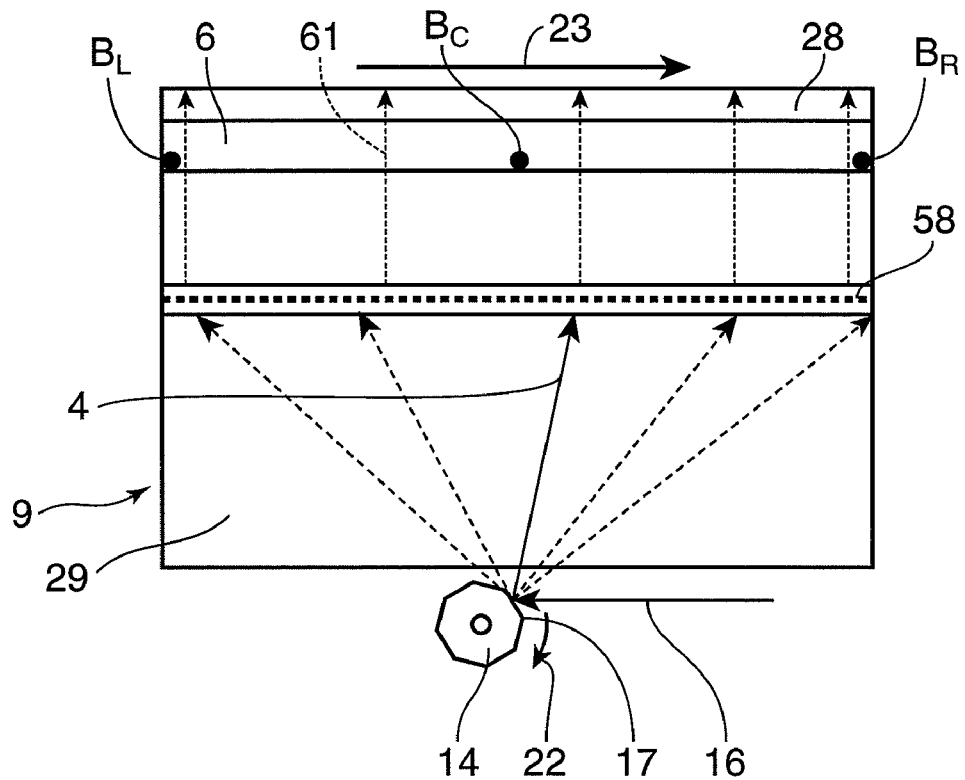
FIG. 30 is a schematic construction diagram of a surface illumination device according to a fourth embodiment of the invention when viewed from behind.
Figure 31:
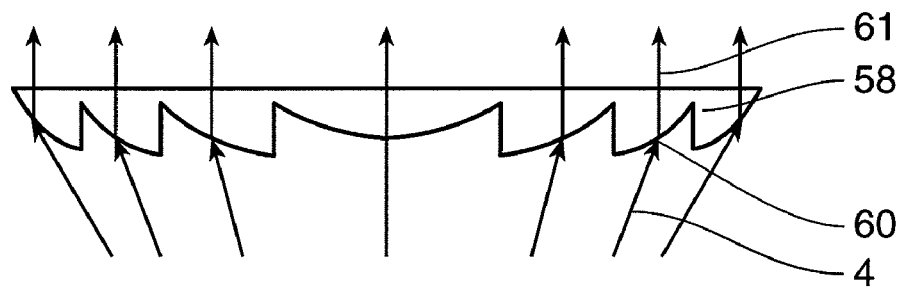
FIG. 31 is a diagram of a Fresnel lens used in the surface illumination device.
Figure 32:
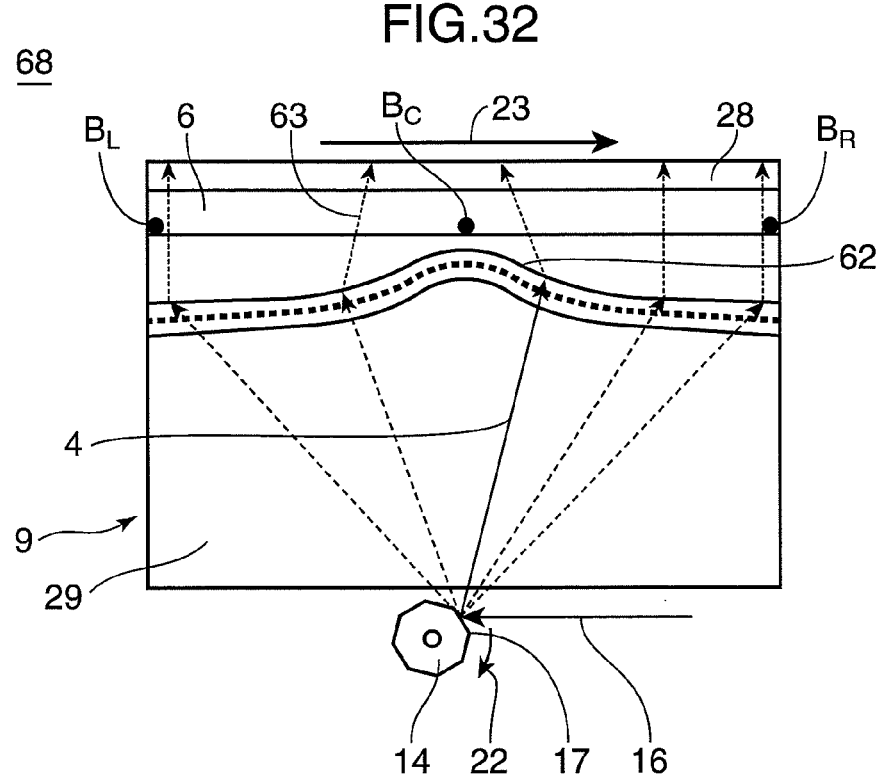
FIG. 32 is a schematic construction diagram showing a state after luminance is adjusted in the surface illumination device shown in FIG. 30.

FIG. 30 is a schematic construction diagram of a surface illumination device 57 according to a fourth embodiment of the invention when viewed from behind, FIG. 31 is a diagram of a Fresnel lens 58 used in the surface illumination device 57, and FIG. 32 is a schematic construction diagram showing a state after luminance is adjusted in the surface illumination device 57 shown in FIG. 30.

As shown in FIG. 30, the surface illumination device 57 according to this embodiment includes the Fresnel lens 58 capable of converting scanning lights 4 from a polygonal mirror 14 into parallel lights perpendicular to the longitudinal direction of a light guiding portion 6 and differs from the above respective embodiments in including no guiding member 10.

In a state shown in FIG. 30, scanning lights 61 from the Fresnel lens 58 are incident on the light guiding portion 6. Specifically, in the surface illumination device 57 shown in FIG. 30 before a luminance adjustment, the scanning lights 4 obliquely incident on the Fresnel lens 58 are converted into parallel beams by lens surfaces 60 of the Fresnel lens 58 to be outputted as scanning lights 61.

Here, since the Fresnel lens 58 shown in FIG. 31 is a molded product of a resin material such as a polycarbonate resin or polyolefin resin, it is also possible to form the Fresnel lens 58 partly curved beforehand as shown in FIG. 32.

For example, if the Fresnel lens 58 is shaped as shown in FIG. 32, the scanning lights 4 introduced near the central part of the light guiding portion 6 are polarized by a convexly curved part 62 of the Fresnel lens 58 and gathered toward the central part of the light guiding portion 6 like scanning lights 63. Therefore, a surface illumination device 68 having higher luminance of the scanning lights 4 in its central part in a scanning direction 23 can be realized.

Figure 33:
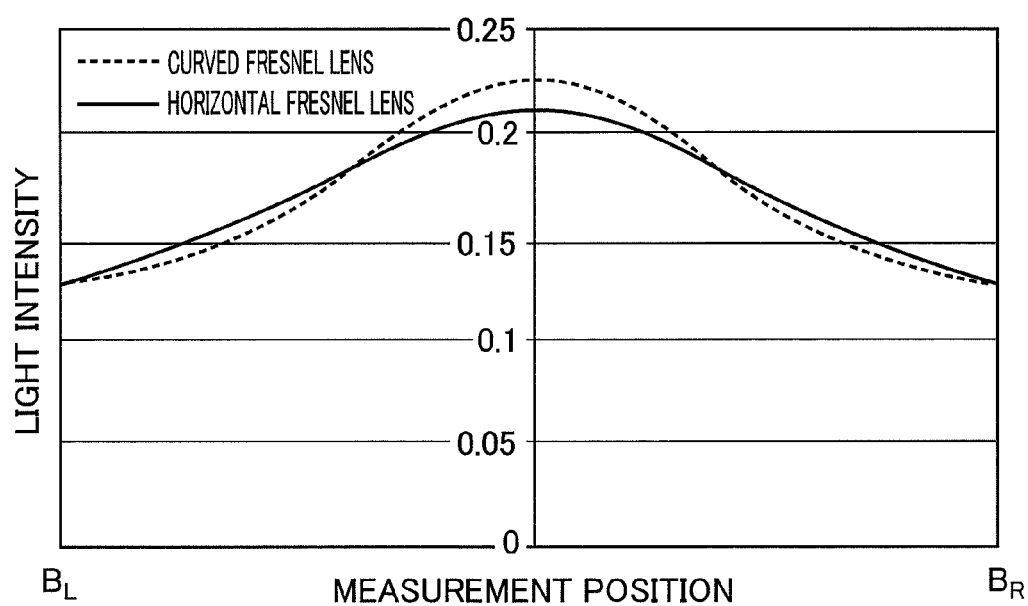
FIG. 33 is a graph showing a light intensity distribution of a laser light irradiated to an incident surface of a light guiding portion.

FIG. 33 is a graph showing a light intensity distribution of laser lights irradiated to the incident surface of the light guiding portion 6. It can be understood that luminance is higher in the central part in the case where the Fresnel lens 58 is curved as shown in FIG. 32 (broken line in FIG. 33) as compared to the case where the Fresnel lens 58 has a straight shape (see FIG. 30) (solid line in FIG. 33). In this way, the luminance distribution on the screen can be adjusted by a simple construction according to this embodiment.

If the Fresnel lens 58 is constructed to be slidable in an optical axis direction (directions toward and away from the light guiding portion 6) and to be bendable in real time at an arbitrary position in a certain range, the luminance distribution at the arbitrary position of the screen in the scanning direction 23 can be adjusted.

For example, if the central part of the Fresnel lens 58 is convexly curved toward the light guiding portion 6 as shown in FIG. 32, luminance in the central part of the screen can be increased in real time while power consumption is maintained. Accordingly, if the surface illumination device 68 is used as a backlight of a liquid crystal display device as shown in FIG. 6, visibility upon viewing images can be improved while power consumption is maintained Conversely, if the Fresnel lens 58 is concavely curved toward the polygonal mirror 14, luminance in the central part of the screen decreases, but the luminance in the entire screen can be made more uniform.

Of course, the Fresnel lens 58 may be so constructed as to automatically adjust the luminance according to contents of screens to be displayed and video contents. For example, the luminance in the central part to be watched is increased in the case of movies and the entire luminance is made uniform to enable the entire screen to be watched in the case of sports.

It is possible not only to adjust the center luminance, but also to adjust the luminance at positions distanced from the center of an image or to adjust the luminance at a plurality of positions. For example, for a display such as an advertising screen installed at such a high position, e.g. outdoors, that viewers look up, visibility can be further improved by locally increasing the luminance in an upper part of the screen more distant from the viewers.

Although the construction for generating the scanning lights 4 using the polygonal mirror 14 and causing the scanning lights 4 to be incident on the light guiding portion 6 is illustrated in FIGS. 30 to 32, the line diffuser 43 may also be used as shown in FIG. 10 in place of the polygonal mirror 14 similar to the above embodiments. In other words, the laser lights 2 may be linearly diffused by the line diffuser 43 to be irradiated to the light guiding portion 6.

In this case, a cylindrical lens or a lenticular lens having a power in the longitudinal direction of the light guiding portion 6 is, for example, used as the line diffuser 43. The cylindrical lens and the lenticular lens respectively have a function of linearly expanding the laser lights 2 from the laser light sources 3 along the longitudinal direction of the light guiding portion 6. However, the lenticular lens can more uniformly diffuse the laser lights 2 in the longitudinal direction of the light guiding portion 6 than the cylindrical lens.

Although not shown, it is also possible to scan the laser lights 2 by polarizing them using a galvanometer mirror in place of the polygonal mirror 14 or the line diffuser 43.

It is also possible to use the surface illumination devices 57, 68 in place of the surface illumination device 1 as the backlight of the liquid crystal display device 32 shown in FIG. 5. With such use, the liquid crystal display device 32 capable of making the light intensities of the laser lights 2 incident on the light guiding portion 6 substantially uniform in the longitudinal direction of the light guiding portion 6 or adjusting them to a specified light intensity distribution in the longitudinal direction can be realized.

The laser light sources of the surface illumination devices 57, 68 include the light sources 3 for emitting at least red, green and blue laser lights. By introducing the respective laser lights 2 from the laser light sources 3 to the polygonal mirror 14 or the line diffuser 43 along the common optical path to be incident on the light guiding portion 6, a high-luminance liquid crystal display device with a wide color gamut can be realized.

Fifth Embodiment

Figure 34:
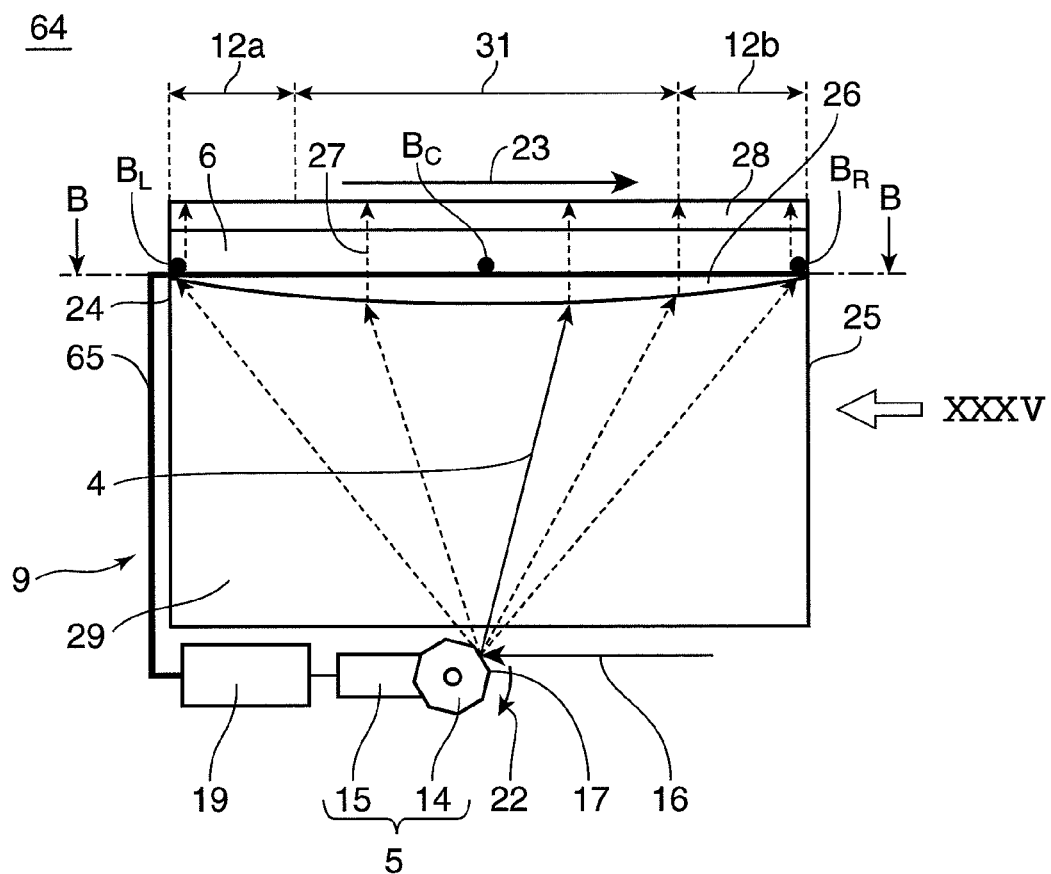
FIG. 34 is a schematic construction diagram of a surface illumination device according to a fifth embodiment of the invention when viewed from behind.
Figure 35:
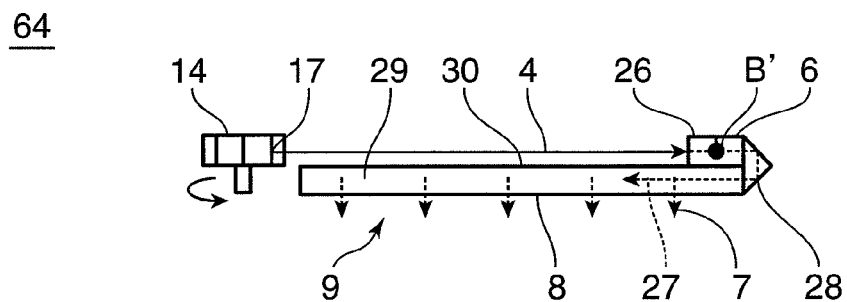
FIG. 35 is a side view of a main part of the surface illumination device when viewed in a direction XXXV of FIG. 34.

FIG. 34 is a schematic construction diagram of a surface illumination device 64 according to a fifth embodiment of the invention when viewed from behind, and FIG. 35 is a side view of a main part when the surface illumination device 64 is seen in a direction XXXV of FIG. 34.

The surface illumination device 64 shown in FIG. 34 differs from the surface illumination device 1 of FIG. 1 in including no guiding member 10 and including an unillustrated light receiving element. The light receiving element is provided at a measurement position $B_L$ of a light guiding portion 6 for receiving some of scanning lights 4 from a polygonal mirror 14. The light receiving element is so constructed as to be able to output electrical signals to a controller 19 via a wiring 65.

Specifically, in the surface illumination device 64, laser lights 2 are reflected by the polygonal mirror 14 to be incident on the light guiding portion 6 as the scanning lights 4. The scanning lights 4 incident on the light guiding portion 6 in this way are partly received by the light receiving element.

In this embodiment, the polygonal mirror 14 is PWM (pulse width modulation) controlled by the controller 19. In other words, the controller 19 measures an amount of deviation from a reference pulse width and controls the rotating speed of the polygonal mirror 14 through a negative feedback. Specifically, by setting such that a plurality of pulses are generated within a period corresponding to one surface of the polygonal mirror 14 and the pulse widths thereof are arbitrarily modulated on a time axis, it becomes possible to finely adjust the rotating speed within a scan angle corresponding to one surface of the polygonal mirror 14. An output signal of the light receiving element arranged at $B_L$ can be used as a control start timing of each scan.

By doing so, the luminance distribution in the scanning direction 23 can be easily adjusted. Further, if the pulse widths can be modulated in real time, luminance in the central part of the screen can be increased in real time while power consumption used for light sources is maintained, for example, by increasing the pulse widths in a range corresponding to the central part of the screen. Accordingly, if the surface illumination device 64 is, for example, used as a backlight of a liquid crystal display device, images with high visibility can be displayed while power consumption is maintained.

If only the luminance in the central part of the screen is to be increased, a method can be thought according to which the light intensities of the laser lights 2 are modulated. However, in the case of adopting such a method, the light intensities of the laser lights 2 are decreased where luminance is wished to be lower. Thus, the total luminance decreases, which is inconvenient. On the contrary, in the surface illumination device 64 according to this embodiment, luminance can be adjusted in the scanning direction 23 without modulating the light intensities of the illuminating laser lights 2. Thus, the luminance distribution of the screen can be adjusted in real time without decreasing the total luminance. Of course, the rotating speed of the polygonal mirror 14 may be automatically adjusted according to contents of screens to be displayed and video contents. For example, the rotating speed of the polygonal mirror 14 can be adjusted such that the luminance in the central part to be watched is increased in the case of movies and the entire luminance is made uniform to enable the entire screen to be watched in the case of sports.

It is also possible not only to adjust the luminance in the central part, but also to adjust the luminance at a position distanced from the center of an image. It is further possible to adjust the luminance at a plurality of positions within a scan range corresponding to one surface of the polygonal mirror 14 at once. For example, for a display such as an advertising screen installed at such a high position, e.g. outdoors, that viewers look up, visibility can be improved by locally increasing the luminance in an upper part of the screen more distant from the viewers.

The luminance distribution in the scanning direction 23 can be adjusted to a specified luminance distribution also by changing the shape of the mirror surfaces 17 of the polygonal mirror 14. This is described below with reference to FIGS. 36 and 37.

Figure 36:
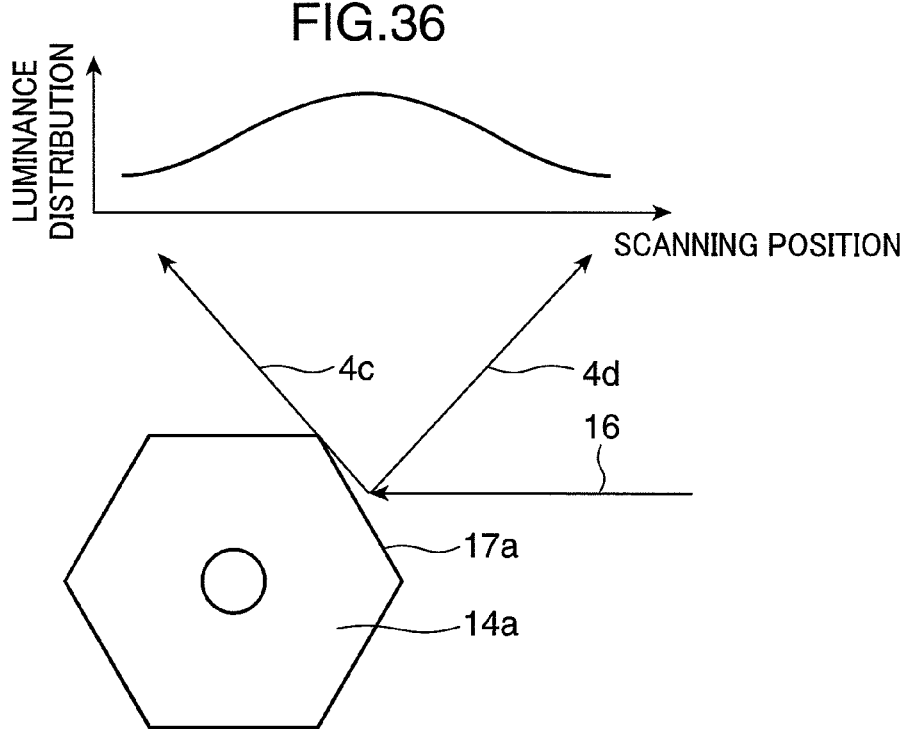
FIG. 36 is a schematic diagram showing a polygonal mirror having flat mirror surfaces.
Figure 37:
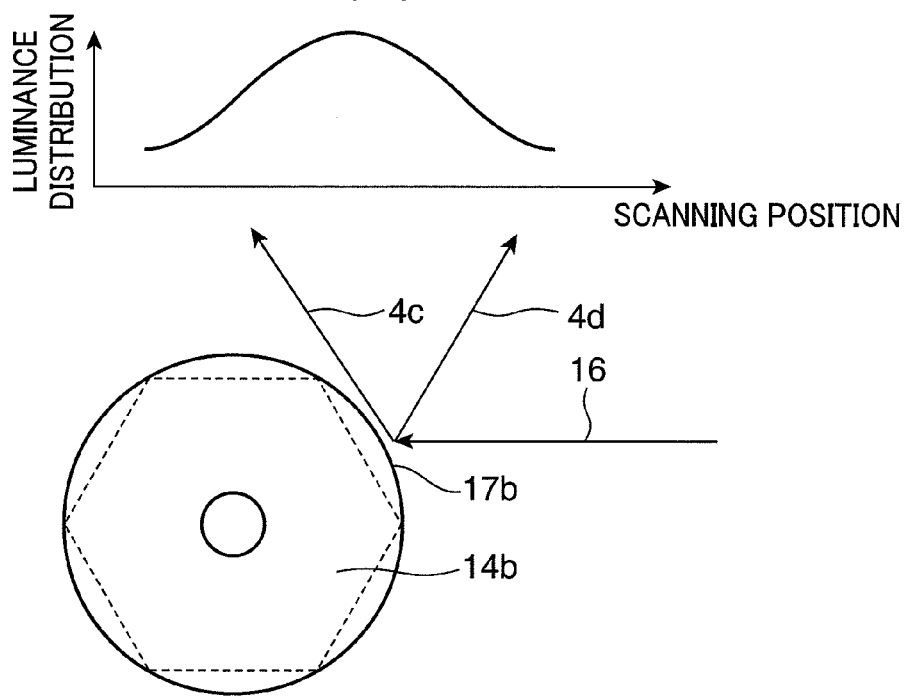
FIG. 37 is a schematic diagram in the case where the mirror surfaces are convex surfaces.

FIG. 36 is a schematic diagram showing a polygonal mirror 14a having flat mirror surfaces 17a, and FIG. 37 is a schematic diagram in the case where the mirror surfaces 17b are convex surfaces. It should be noted that FIG. 37 shows a superlative of a curvature radius of the surfaces 17b of the polygonal mirror 14a.

As shown in FIGS. 36 and 37, laser lights 2 are reflected by the mirror surfaces 17 (17a, 17b) of the polygonal mirror 14 (14a, 14b) to become scanning lights 4 (e.g. 4c, 4d).

With reference to FIG. 36, luminance is high in a central part in the scanning direction and lower at the opposite ends if the mirror surfaces 17a are flat surfaces. On the other hand, as shown in FIG. 37, luminance is higher in the central part in the scanning direction than in the case of FIG. 36 if the mirror surfaces 17b of the polygonal mirror 14b are convex surfaces. This is because the scanning speed of the laser lights 2 becomes slower in the central part in the scanning direction in the case of employing the convex mirror surface 17b than in the case of employing the flat mirror surfaces 17a. A hexagonal shape shown by broken line in the polygonal mirror 14b indicates the shape of the polygonal mirror 14a.

All of the mirror surfaces 17b of the polygonal mirror 14b are convex surfaces in FIG. 37. However, by forming at least one of the respective mirror surfaces into the mirror surface 17b, the above effect can be obtained for this mirror surface 17b.

Although the convex mirror surfaces 17b are described in the above embodiment, the shape of the mirror surfaces of the polygonal mirror can be suitably set. By forming the mirror surface into a specified curved shape, the luminance distribution can be adjusted in accordance with this curved shape. Specifically, the mirror surfaces are formed to have a convex shape to improve the center luminance in the above embodiment in the above example. However, it is also possible to make the luminance uniform over the entire principal surface of the light guiding plate 9 by forming the mirror surfaces to have a concave shape to decrease the center luminance.

Figure 38:
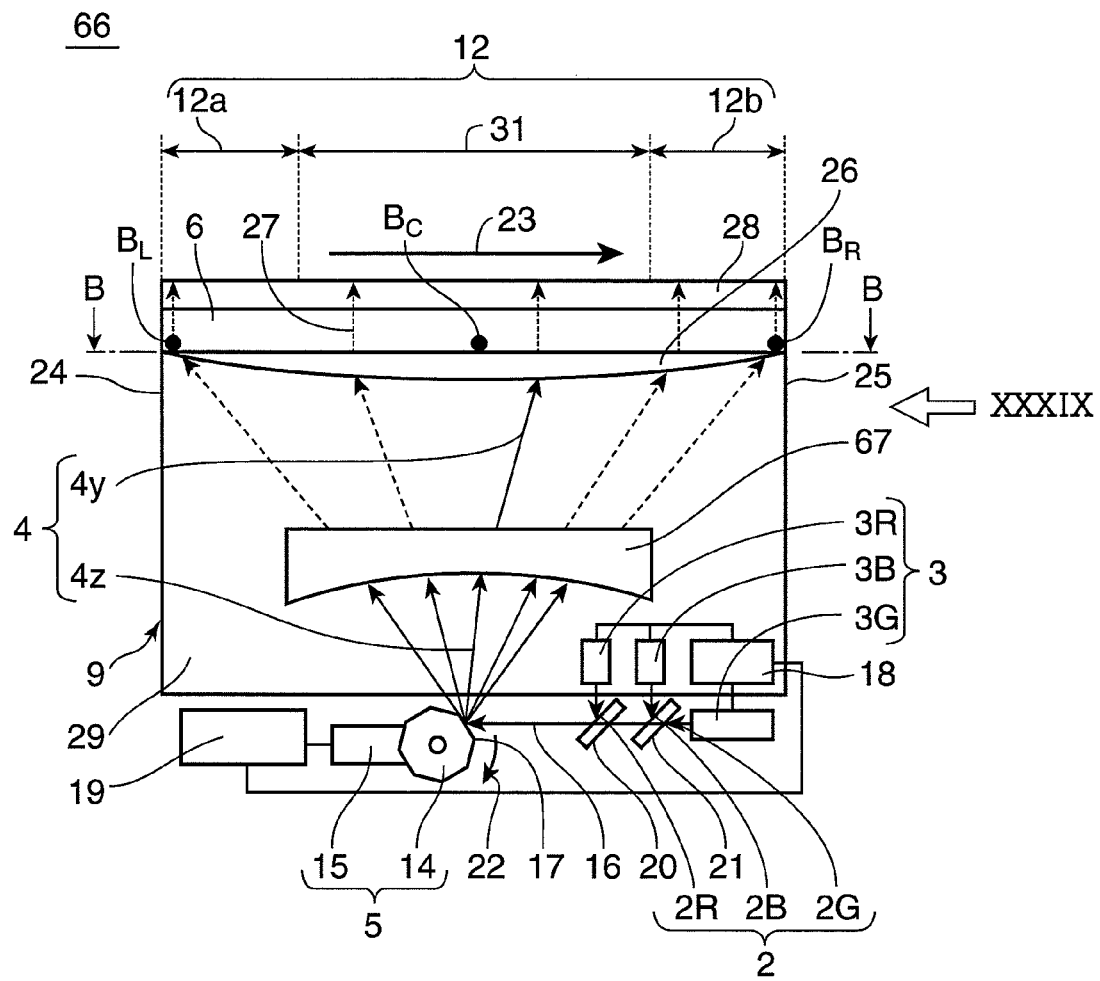
FIG. 38 is a schematic construction diagram of a surface illumination device according to a modification of the fifth embodiment when viewed from behind.
Figure 39:
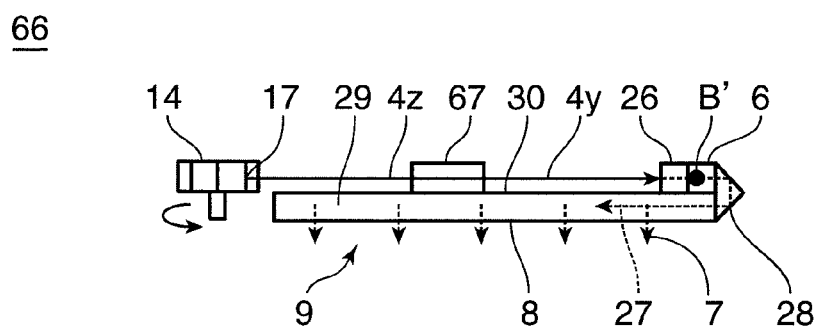
FIG. 39 is a side view of a main part of the surface illumination device when viewed in a direction XXXIX of FIG. 38.

A surface illumination device 66 shown in FIGS. 38 and 39 can be thought as another construction for further increasing the center luminance. FIG. 38 is a schematic construction diagram of a surface illumination device according to a modification of the fifth embodiment when viewed from behind, and FIG. 39 is a side view of a main part of the surface illumination device when viewed in a direction XXXIX of FIG. 38.

As shown in FIGS. 38 and 39, the surface illumination device 66 of this embodiment is provided with laser light sources 3 for emitting laser lights 2, a scanning unit 5 for generating scanning lights 4 by reflecting the laser lights 2, a light guiding plate 9 on which the scanning lights 4 are incident, a scanning lens 67 positioned between the scanning unit 5 and the light guiding portion 6 and a controller 19. The scanning lens 67 is a lens having a lens power of 0 or below in a scanning direction 23 for a scanning light 4z. For example, a convex lens can be used as the scanning lens 67 as shown in FIG. 38.

The light guiding plate 9 includes a cylindrical lens 26, a light guiding portion 6, a connecting portion 28 and a light guiding plate main body 29 similar to the above embodiments.

The scanning unit 5 includes a polygonal mirror 14 and a driving portion 15 for driving the polygonal mirror 14.

The scanning light 4z from the polygonal mirror 14 has the optical path thereof changed by the scanning lens 67 arranged between the polygonal mirror 14 and the light guiding portion 6 to be incident on the light guiding portion 6 as a scanning light 4y. In other words, the scanning lights 4 are incident on the light guiding portion 6 after being diverted by the scanning lens 67. Here, the scanning lens 67 is constructed such that the luminance of an emergent light 7 emerging from a principal surface 8 of the light guiding plate main body 29 is higher in a central part 31 in the scanning direction 23 and lower at opposite ends 12.

By having such a construction, a surface illumination device in which the luminance of the scanning lights 4 is high in the central part in the scanning direction 23 can be realized. Accordingly, if the surface illumination device 66 is used, for example, as a backlight of a liquid crystal display device, visibility can be improved without increasing the luminance of the entire image by increasing the luminance in the central part 31 of the displayed image as compared to the one at the opposite ends 12. Therefore, images looking more clearly and beautifully can be displayed while power consumption is suppressed.

Here, an average value of the luminance in the central part 31 in the scanning direction 23 is preferably 1.2 times as large as or larger than, but 1.4 times as large as or larger than that of the luminance at the opposite ends 12. Discomfort is brought if the former average value is larger than that, whereas the effect is weak if this average value is lower than that.

Figure 40:
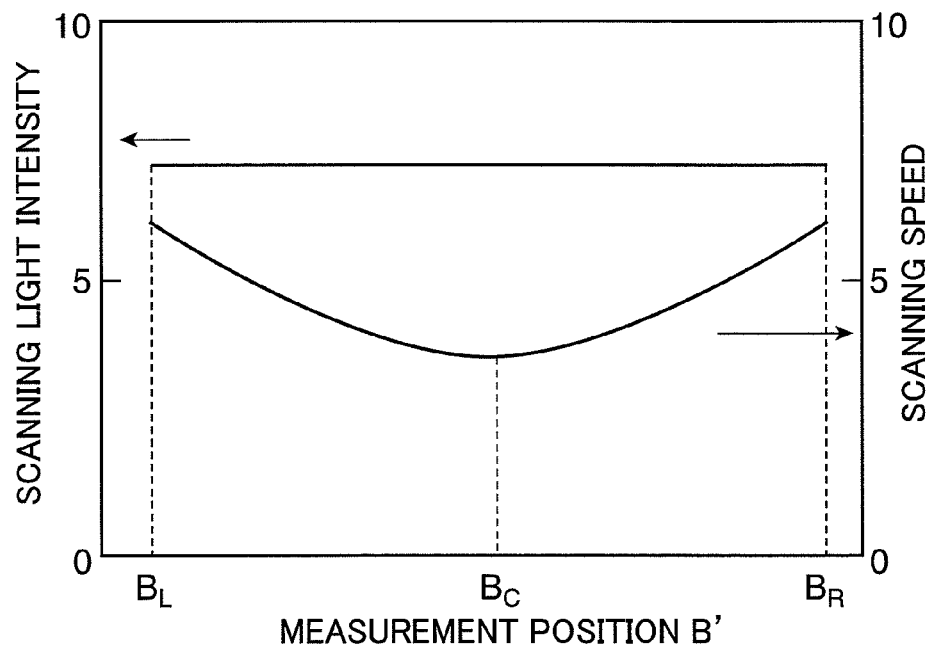
FIG. 40 is a graph showing a relationship between the scanning light intensities and the scanning speeds of scanning lights at measurement positions B' ($B_L$, $B_C$, $B_R$) of a light guiding portion in a section along B-B of FIG. 39.
Figure 41:
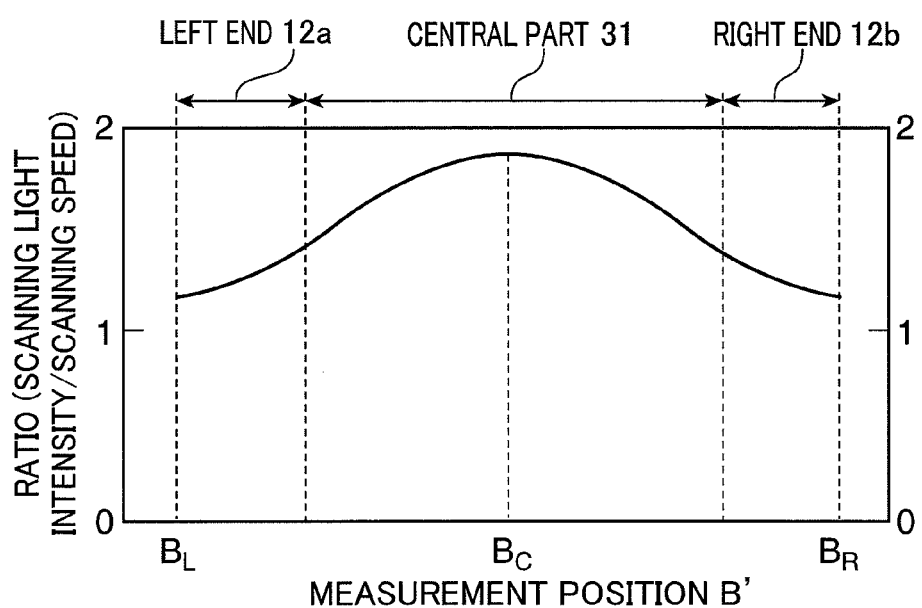
FIG. 41 is a graph showing ratios of the scanning light intensity and the scanning speed at the measurement positions B' of FIG. 39.

FIG. 40 is a graph showing a relationship between the scanning light intensities and the scanning speeds of scanning lights at measurement positions B' ($B_L$, $B_C$, $B_R$) of the light guiding portion 6 in a section along B-B of FIG. 39, and FIG. 41 is a graph showing ratios of the scanning light intensity and the scanning speed at the measurement positions B' of FIG. 39.

In FIG. 40, an average value of the ratios of the scanning light intensity and the scanning speed at the opposite ends 12 (12a, 12b) in the scanning direction 23 is 1.3 and that of the ratios of the scanning light intensity and the scanning speed in the central part 31 is 1.7. Accordingly, the average value of the luminance in the central part 31 is 1.3 times as large as that of the luminance at the opposite ends 12.

Here, the luminance distributions in the central part 31 and at the opposite ends 12 can be changed by changing a distance between the scanning lens 67 and the light guiding portion 6. If the distance between the scanning lens 67 and the light guiding portion 6 is adjustable, a user can adjust the luminance distribution of the emergent light 7 from the surface illumination device 66 in real time according to scenes.

Further, since the optical paths of the laser lights 2 introduced from the laser light sources 3 to the light guiding portion 6 via the scanning unit 5 are set at the back surface 30 side of the light guiding plate 9 in this embodiment, a thin and lightweight surface illumination device can be realized.

It is also possible to use the surface illumination devices 64, 66 in place of the surface illumination device 1 as the backlight of the liquid crystal display device 32 shown in FIG. 5. With such use, the liquid crystal display device 32 capable of making the light intensities of the laser lights 2 incident on the light guiding portion 6 substantially uniform in the longitudinal direction of the light guiding portion 6 or adjusting them to a specified light intensity distribution in the longitudinal direction can be realized.

Further, the laser light sources of the surface illumination devices 64, 66 include the light sources 3 for emitting at least red, green and blue laser lights. By introducing the respective laser lights 2 from the laser light sources 3 to the scanning unit 5 along the common optical path to be incident on the light guiding portion 6, a high-luminance liquid crystal display device with a wide color gamut can be realized.

The specific embodiments described above mainly embrace inventions having the following constructions.

A surface illumination device according to one aspect of the present invention comprises a laser light source for emitting a laser light; a light guiding plate having an incident surface on which the laser light is incident and a principal surface from which the laser light emerges as a surface emergent light; an irradiating member capable of irradiating the laser light from the laser light source within an irradiation range including an incident range for introducing the laser light to the incident surface of the light guiding plate and an outside range set outside the incident range in the longitudinal direction of the incident surface; and a guiding member capable of introducing a part of the laser light from the irradiating member within the outside range to the incident surface, the laser light from the irradiating member and the laser light from the guiding member being respectively introduced to at least a part of the incident surface.

According to the present invention, the part of the laser light from the irradiating member within the outside range, i.e. the laser light that would have been lost before, can be caused to be incident on the incident surface of the light guiding plate by the guiding member. Further, since the laser light from the irradiating member is directly introduced at a position on the incident surface to which the laser light is introduced by the guiding member, the light intensity of the laser light at this position on the incident surface can be increased.

Thus, according to the present invention, the luminance of the laser light emerging from the principal surface of the light guiding plate can be increased at the position, where the laser light from the guiding member is incident, in the longitudinal direction of the incident surface.

According to the present invention, it is also possible to suppress speckle noise since the laser light from the irradiating member and the one from the guiding member having different optical paths can be introduced to the light guiding plate.

As described above, since both the reduction of the loss of the laser light and adjustment to a desired luminance distribution can be realized in the present invention, visibility can be improved while power consumption is suppressed even in the case of the use in a large-size display device.

In the above surface illumination device, the guiding member preferably includes reflection mirrors extending from the opposite longitudinal ends of the incident surface toward the irradiating member.

According to this construction, cost can be reduced since the luminance of the laser light emerging from the principal surface of the light guiding plate can be adjusted only by providing the reflection mirrors at the opposite ends of the incident surface.

In the above surface illumination device, the lengths of the respective reflection mirrors from the incident surface to the leading ends thereof are preferably set different.

According to this construction, the luminance of the laser light emerging from the principle surface of the light guiding plate can be set higher at one longitudinal side of the incident surface while being set lower at the other side. Thus, if the above surface illumination device is used, for example, as a backlight of a liquid crystal display device to be looked up from below, display more easily seen by viewers can be realized while power consumption is kept constant by decreasing the luminance of a lower part of the light guiding plate and increasing the luminance of an upper part.

In the above surface illumination device, the guiding member preferably includes a refractive member for refracting the laser light from the irradiating member.

In this construction as well, laser light utilization efficiency can be improved since the laser light that would have been lost before can be effectively utilized. By constructing the surface illumination device such that the laser light refracted by the refractive member is introduced to a position where luminance is originally insufficient, it can be also realized to make the luminance uniform. Further, cost can be reduced since the luminance of the laser light emerging from the principal surface of the light guiding plate can be adjusted only by providing the refractive member.

In the above surface illumination device, the guiding member preferably includes reflection mirrors extending from the opposite longitudinal ends of the incident surface toward the irradiating member and a refractive member for refracting the laser light from the irradiating member.

With such a construction, laser light that would have been lost before can be effectively utilized using the reflection mirrors and the refractive member. Further, since the laser light is polarized using members having different polarization directions, i.e. reflection by the reflection mirrors and refraction by the refractive member, the reflection mirrors and the refractive member can be relatively freely arranged and the miniaturization of the surface illumination device can be promoted.

In the above surface illumination device, it is preferable that the refractive member is a lens having a central region arranged in correspondence with the incident range of the irradiating member and opposite side regions outside the central region; and that the lens characteristic of the central region is different from that of the opposite side regions.

With such a construction, laser light that would have been lost in the absence of the refractive member can be introduced to the incident surface of the light guiding plate by causing the laser light in the incident range to pass the opposite side regions of the refractive member to change an optical path.

In the above surface illumination device, it is preferable that a plurality of refractive members are provided; and that the respective refractive members are arranged to define a clearance therebetween, through which at least a part of the laser light from the irradiating member in the incident range can pass.

Further, in the above surface illumination device, a passing portion for allowing at least a part of the laser light from the irradiating member in the incident range to pass may be formed in the refractive member and the passing portion may be made of a transparent member having a lens power of 0.

According to these constructions, laser light that would have been lost before can be introduced to the incident surface while the laser light in the incident range is irradiated to the incident surface.

In the above surface illumination device, it is preferable that the guiding member includes reflection mirrors extending from the opposite longitudinal ends of the incident surface toward the irradiating member and a refractive member for refracting the laser light from the irradiating member; that the refractive member is formed with a refracting portion for refracting at least a part of the laser light from the irradiating member in the outside range toward the incident surface and a passing portion for allowing at least a part of the laser light from the irradiating member to pass; and that the reflection mirrors reflect the laser light in the outside range out of the laser light having passed the passing portion of the refracting portion.

According to this construction, laser light that would have been lost before can be introduced to the incident surface of the light guiding plate by both the refractive member and the reflection mirrors since the part of the laser light having passed the passing portion of the refractive member is reflected by the reflection mirrors.

In the above surface illumination device, it is preferable to further comprise an adjusting mechanism for adjusting a distance between the refractive member and the incident surface of the light guiding plate.

With such a construction, a luminance distribution on the principal surface of the light guiding plate in the longitudinal direction of the incident surface can be freely adjusted.

In the above surface illumination device, the refractive member is preferably a cylindrical lens or a cylindrical Fresnel lens.

With such a construction, laser light can be effectively utilized using, for example, a ready-made product, wherefore a simpler and low-cost surface illumination device can be provided.

A surface illumination device according to another aspect of the present invention comprises a laser light source for emitting a laser light; a light guiding plate having an incident surface on which the laser light is incident and a principal surface from which the laser light emerges as a surface emergent light; and an irradiating member capable of irradiating the laser light from the laser light source to the incident surface of the light guiding plate over a specified range extending in the longitudinal direction of the incident surface of the light guiding plate, wherein the irradiating member is constructed such that a light intensity distribution of the laser light incident on the incident surface becomes a specified light intensity distribution in the longitudinal direction of the incident surface.

According to the present invention, the laser light is incident on the light guiding plate with the specified luminance distribution determined by the irradiating member, whereby the luminance distribution of the laser light emerging from the principal surface of the light guiding plate can be adjusted.

Specifically, in the above surface illumination device, the irradiating member may include a Fresnel lens arranged between the light guiding plate and the laser light source and capable of converting the laser light from the laser light source into a parallel light, and the Fresnel lens may be so constructed as to be curved in a direction intersecting with a plane parallel to the incident surface of the light guiding plate.

With such a construction, the luminance distribution on the principal surface of the light guiding plate can be easily adjusted since the polarization direction of the laser light can be adjusted by the Fresnel lens through the adjustment of the curved shape of the Fresnel lens.

In the above surface illumination device, the Fresnel lens is preferably formed such that the curved position and degree of curvature thereof are adjustable.

With such a construction, the luminance distribution on the principal surface of the light guiding plate can be freely adjusted in the longitudinal direction of the incident surface.

In the above surface illumination device, it is preferable that the irradiating member includes a scanning unit capable of scanning the laser light from the laser light source along the longitudinal direction of the incident surface; and that the scanning unit is so constructed as to be able to adjust the scanning speed of the laser light.

With such a construction, the luminance distribution on the principal surface of the light guiding plate can be adjusted in the longitudinal direction of the incident surface since the light intensity of the laser light incident on the incident surface can be adjusted by adjusting the scanning speed of the laser light incident on the incident surface of the light guiding plate.

In the above surface illumination device, it is preferable that the irradiating member includes a scanning unit of scanning the laser light from the laser light source along the longitudinal direction of the incident surface by changing an angle of a reflecting surface capable of reflecting the laser light from the laser light source with respect to the incident surface; and that the reflecting surface is formed to be a curved surface.

With such a construction, the luminance distribution on the principal surface of the light guiding plate can be adjusted in the longitudinal direction of the incident surface since the scanning speed of the laser light on the incident surface of the light guiding plate can be adjusted according to the curved shape of the reflecting surface.

In the above surface illumination device, it is preferable that the irradiating member includes a lens arranged between the light guiding plate and the laser light source; and that the power of the lens is set to 0 or below.

With such a construction, luminance in a central part of the principal surface of the light guiding plate in the longitudinal direction can be increased as compared to that of the other part since the laser light from the laser light source can be incident on the incident surface of the light guiding plate after being converted into a radiant light by the lens.

In the above surface illumination device, a distance between the lens and the light guiding plate is adjustable.

With such a construction, luminance in the central part of the principal surface of the light guiding plate in the longitudinal direction can be freely adjusted.

In the above surface illumination device, the maximum luminance of the laser light emerging from the principal surface of the light guiding plate in the longitudinal direction of the incident surface is preferably 1.2 times as high as or higher than, but 1.4 as high as or lower than the minimum luminance.

With such a construction, there can be provided a surface illumination device capable of displaying images with excellent visibility without bringing discomfort to viewers while power consumption is maintained.

In the above surface illumination device, the laser light source preferably includes light sources for emitting at least red, green and blue laser lights.

With such a construction, there can be provided a full-color surface illumination device capable of making the luminance on the principal surface of the light guiding plate uniform or increasing the luminance of a specified part of the principal surface of the light guiding plate while power consumption is reduced.

A liquid crystal display device according to still another aspect of the present invention comprises a liquid crystal display panel and a backlight illumination device for illuminating the liquid crystal display panel from the back side of the panel, wherein the backlight illumination device is the above surface illumination device.

According to the present invention, there can be provided a liquid crystal display capable of making the luminance on the liquid crystal display panel uniform or increasing the luminance of a specified part on the liquid crystal display panel while power consumption is reduced.

By adopting the inventive construction, it can be simultaneously realized to attain high efficiency, a compact size, a low cost, uniform luminance or a luminance increased at a specified part and the suppression of speckle noise in a construction for illuminating the liquid crystal display panel with laser light from the back side.

The surface illumination device according to the present invention is applicable as a backside illumination light source for a liquid crystal television or the like.

This application is based on Japanese Patent Application No. 2007-118671 and No. 2007-118672 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A surface illumination device, comprising:
a laser light source for emitting a laser light;
a light guiding plate having an incident surface on which the laser light is incident and a principal surface from which the laser light emerges as a surface emergent light;
an irradiating member capable of irradiating the laser light from the laser light source within an irradiation range including an incident range for introducing the laser light to the incident surface of the light guiding plate and an outside range set outside the incident range in the longitudinal direction of the incident surface; and
a guiding member capable of introducing a part of the laser light from the irradiating member within the outside range to the incident surface,
the laser light from the irradiating member and the laser light from the guiding member being respectively introduced to at least a part of the incident surface.

2. A surface illumination device according to claim 1, wherein the guiding member includes reflection mirrors extending from the opposite longitudinal ends of the incident surface toward the irradiating member.

3. A surface illumination device according to claim 2, wherein the lengths of the respective reflection mirrors from the incident surface to the leading ends thereof set different.

4. A surface illumination device according to claim 1, wherein the guiding member includes a refractive member for refracting the laser light from the irradiating member.

5. A surface illumination device according to claim 4, wherein:
the refractive member is a lens having a central region arranged in correspondence with the incident range of the irradiating member and opposite side regions outside the central region; and
the lens characteristic of the central region is different from that of the opposite side regions.

6. A surface illumination device according to claim 4, further comprising a plurality of refractive members;
wherein the respective refractive members are arranged to define a clearance therebetween, through which at least a part of the laser light from the irradiating member in the incident range can pass.

7. A surface illumination device according to claim 4, wherein:
a passing portion for allowing at least a part of the laser light from the irradiating member in the incident range to pass is formed in the refractive member; and
the passing portion is made of a transparent member having a lens power of 0.

8. A surface illumination device according to claim 4, further comprising an adjusting mechanism for adjusting a distance between the refractive member and the incident surface of the light guiding plate.

9. A surface illumination device according to claim 4, wherein the refractive member is a cylindrical lens or a cylindrical Fresnel lens.

10. A surface illumination device according to claim 1, wherein the guiding member includes reflection mirrors extending from the opposite longitudinal ends of the incident surface toward the irradiating member and a refractive member for refracting the laser light from the irradiating member.

11. A surface illumination device according to claim 1, wherein:
the guiding member includes reflection mirrors extending from the opposite longitudinal ends of the incident surface toward the irradiating member and a refractive member for refracting the laser light from the irradiating member;
the refractive member is formed with a refracting portion for refracting at least a part of the laser light from the irradiating member in the outside range toward the incident surface and a passing portion for allowing at least a part of the laser light from the irradiating member to pass; and
the reflection mirrors reflect the laser light in the outside range out of the laser light having passed the passing portion of the refracting portion.

12. A surface illumination device according to claim 1, wherein the maximum luminance of the laser light emerging from the principal surface of the light guiding plate in the longitudinal direction of the incident surface is 1.2 times as high as or higher than, but 1.4 as high as or lower than the minimum luminance.

13. A surface illumination device according to claim 1, wherein the laser light source includes light sources for emitting at least red, green and blue laser lights.

14. A liquid crystal display device, comprising:
a liquid crystal display panel and a backlight illumination device for illuminating the liquid crystal display panel from the back side of the panel,
wherein the backlight illumination device is a surface illumination device according to claim 1.

* * * * *